(12) United States Patent
Lee et al.

(10) Patent No.: US 11,830,293 B2
(45) Date of Patent: Nov. 28, 2023

(54) ELECTRONIC DEVICE AND METHOD FOR PROVIDING FINGERPRINT RECOGNITION GUIDE USING THE SAME

(71) Applicant: Samsung Electronics Co., Ltd., Suwon-si (KR)

(72) Inventors: Seunghoon Lee, Suwon-si (KR); Yangsoo Lee, Suwon-si (KR); Moonsoo Chang, Suwon-si (KR); Arim Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/825,501

(22) Filed: May 26, 2022

(65) Prior Publication Data

US 2023/0063679 A1    Mar. 2, 2023

Related U.S. Application Data

(63) Continuation of application No. PCT/KR2022/006978, filed on May 16, 2022.

(30) Foreign Application Priority Data

Aug. 26, 2021  (KR) .......................... 10-2021-0113163

(51) Int. Cl.
*G06V 40/13* (2022.01)
*G06V 40/60* (2022.01)
(Continued)

(52) U.S. Cl.
CPC .............. *G06V 40/67* (2022.01); *G06V 40/13* (2022.01); *G06V 40/1359* (2022.01); *G06V 40/1365* (2022.01); *G06V 40/50* (2022.01)

(58) Field of Classification Search
CPC .............. G06V 40/67; G06V 40/1359; G06V 40/1365; G06V 40/13; G06V 40/50
See application file for complete search history.

(56) References Cited

U.S. PATENT DOCUMENTS

| 8,184,866 B2 | 5/2012 | Takaku et al. |
| 10,528,786 B2 | 1/2020 | Lee et al. |
| (Continued) | | |

FOREIGN PATENT DOCUMENTS

| KR | 10-2017-0042291 A | 4/2017 |
| KR | 10-2018-0031511 A | 3/2018 |
| (Continued) | | |

OTHER PUBLICATIONS

International Search Report dated Aug. 12, 2022, issued in International Patent Application No. PCT/KR2022/006978.

*Primary Examiner* — Stephen G Sherman
(74) *Attorney, Agent, or Firm* — Jefferson IP Law, LLP

(57) ABSTRACT

An electronic device is provided. The electronic device includes a display, a fingerprint sensor disposed on one surface of the display, a memory storing a plurality of fingerprint images mapped to information indicative of a plurality of guide lines, and a processor operatively connected to the display, the fingerprint sensor, and the memory. The processor may be configured to display a first user interface (UI) indicative of a fingerprint recognition area and, as a second UI, a guide line corresponding to a fingerprint image having a high quality value among the plurality of fingerprint images stored in the memory by using the display, based on an input signal to request fingerprint authentication being detected, obtain a fingerprint image of a finger by using the fingerprint sensor based on the finger of a user touching the fingerprint recognition area, compare the obtained fingerprint image and a fingerprint image mapped to information indicative of the first UI (Continued)

and/or the second UI, and perform the fingerprint authentication based on the obtained fingerprint image and the mapped fingerprint image being identical with each other based on a result of the comparison.

20 Claims, 12 Drawing Sheets

(51) Int. Cl.
*G06V 40/50* (2022.01)
*G06V 40/12* (2022.01)

(56) References Cited

U.S. PATENT DOCUMENTS

| | | | |
|---|---|---|---|
| 11,308,311 | B2 | 4/2022 | Sandhan et al. |
| 2009/0154779 | A1* | 6/2009 | Satyan ............... G06V 40/1335 382/124 |
| 2009/0245648 | A1* | 10/2009 | Hara ................... G06V 40/1359 382/195 |
| 2010/0148922 | A1* | 6/2010 | Yamada .................. G06F 21/32 340/5.82 |
| 2015/0131876 | A1 | 5/2015 | Chang |
| 2016/0063298 | A1 | 3/2016 | Tunneld et al. |
| 2016/0253544 | A1 | 9/2016 | Weber et al. |
| 2016/0321494 | A1* | 11/2016 | Shin ........................ G06F 21/32 |
| 2017/0115811 | A1* | 4/2017 | Yang ..................... G09G 3/3648 |
| 2017/0364763 | A1* | 12/2017 | Jin ......................... G06F 3/0416 |
| 2021/0133422 | A1 | 5/2021 | Lee et al. |

FOREIGN PATENT DOCUMENTS

| | | |
|---|---|---|
| KR | 10-1869433 B1 | 6/2018 |
| KR | 10-2018-0085587 A | 7/2018 |
| KR | 10-2019-0093003 A | 8/2019 |
| KR | 10-2020638 B1 | 11/2019 |
| KR | 10-2021-0154026 A | 12/2021 |

* cited by examiner

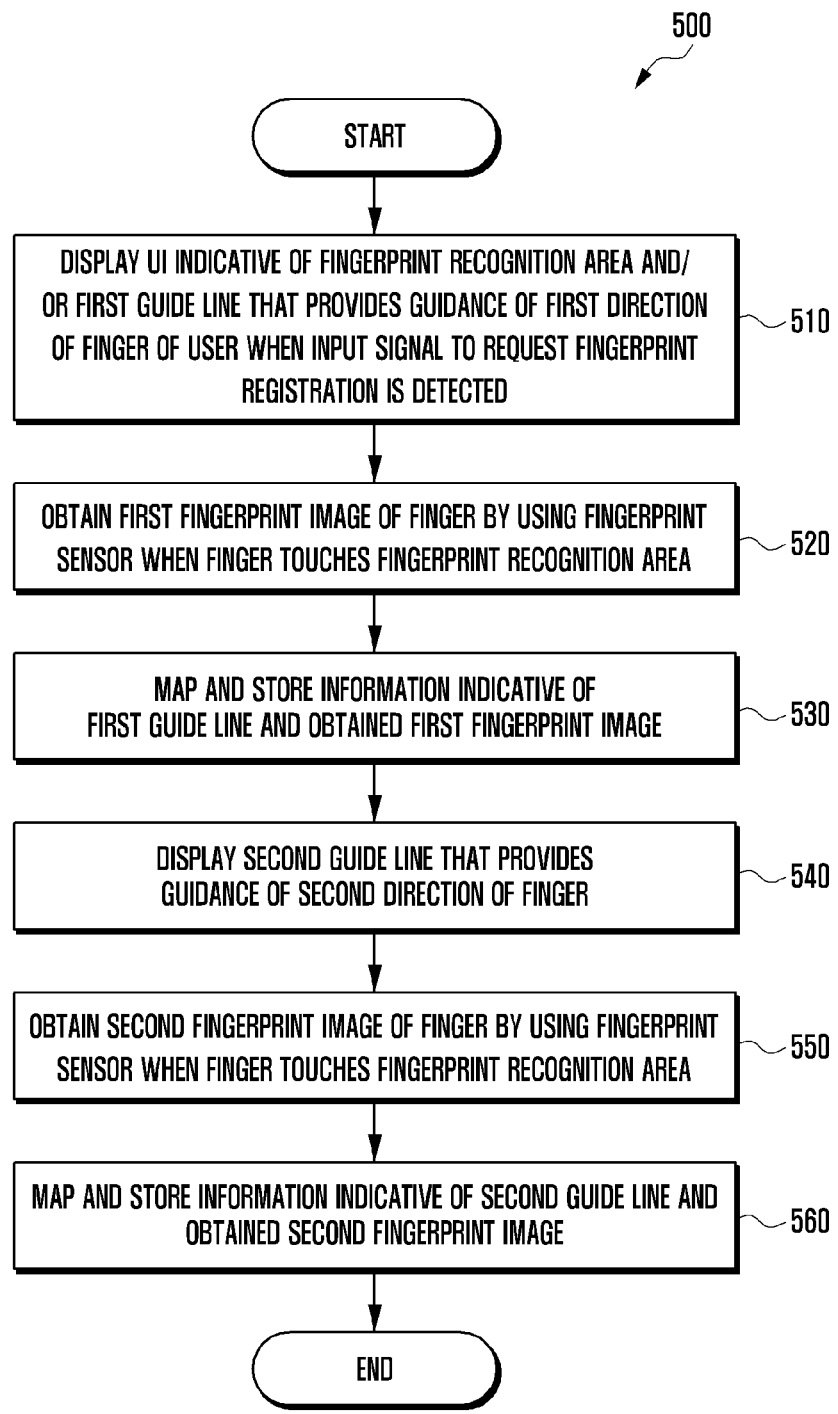

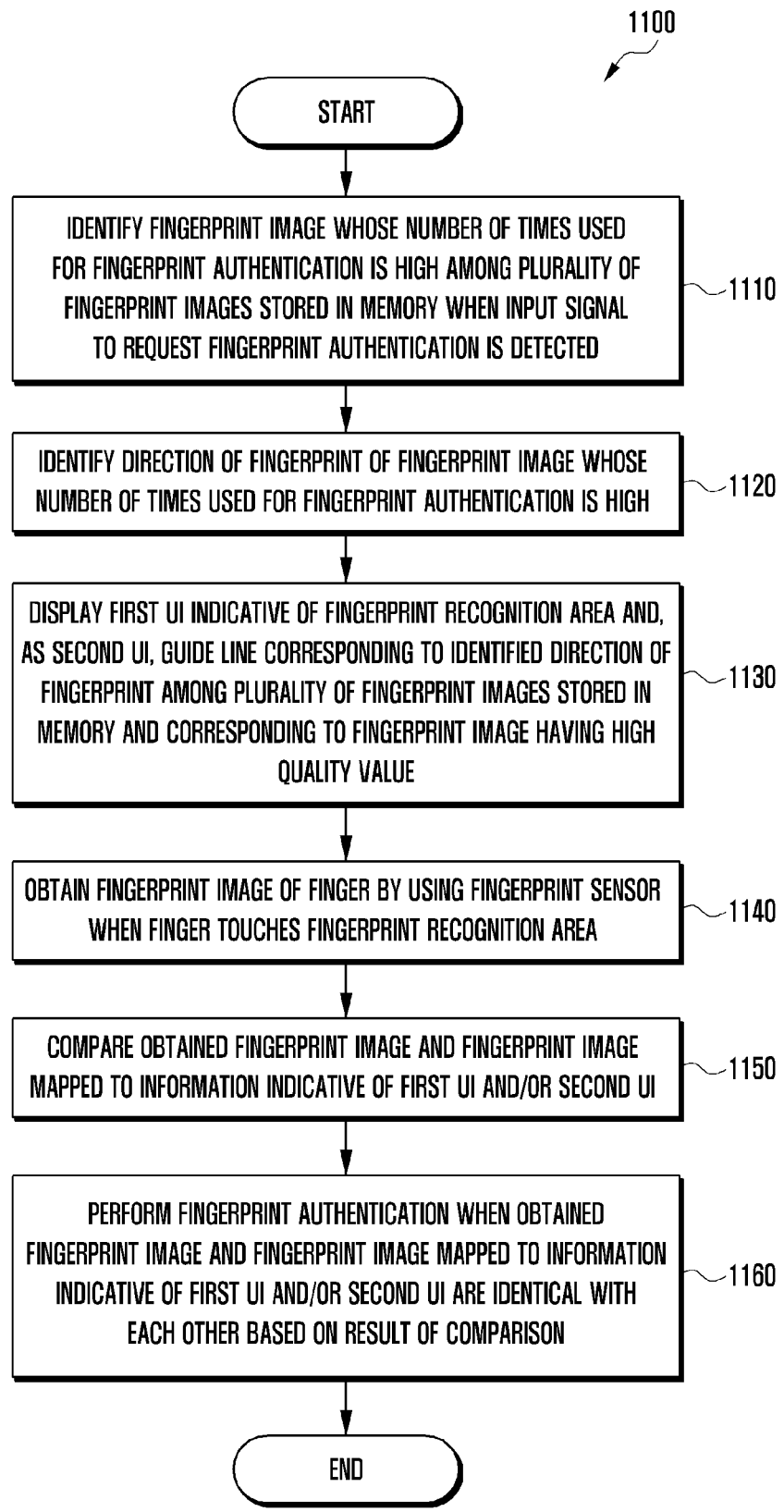

ELECTRONIC DEVICE AND METHOD FOR PROVIDING FINGERPRINT RECOGNITION GUIDE USING THE SAME

CROSS-REFERENCE TO RELATED APPLICATION(S)

This application is a continuation application, claiming priority under § 365(c), of an International application No. PCT/KR2022/006978, filed on May 16, 2022, which is based on and claims the benefit of a Korean patent application number 10-2021-0113163, filed on Aug. 26, 2021, in the Korean Intellectual Property Office, the disclosure of which is incorporated by reference herein in its entirety.

TECHNICAL FIELD

The disclosure relates to an electronic device and a method of providing a fingerprint recognition guide using the same.

BACKGROUND ART

An electronic device may obtain bio information of a user from a sensor (e.g., a fingerprint sensor or an image sensor), and may perform user authentication based on the obtained bio information. For example, if bio information of a user is obtained by using the fingerprint sensor, when a finger touches the fingerprint sensor attached to the bottom of a display, the electronic device may obtain a fingerprint image of the finger through the fingerprint sensor and perform fingerprint recognition. In order to increase a recognition rate of the fingerprint recognition, the electronic device may display a fingerprint guide, such as a fingerprint icon, on a display at a location corresponding to the fingerprint sensor.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

However, if the fingerprint sensor attached to the bottom of the display is smaller than the size of the fingerprint icon, an obtained fingerprint image may be different because which part of the fingerprint icon the user is touching or which part of the finger is touching the fingerprint icon is unknown. In this case, despite the finger of the same user, the obtained fingerprint image and a fingerprint image registered in the electronic device may be different. Accordingly, the fingerprint recognition rate may be decreased.

Aspects of the disclosure are to address at least the above-mentioned problems and/or disadvantages and to provide at least the advantages described below. Accordingly, an aspect of the disclosure is to provide an electronic device for displaying a fingerprint icon indicative of a fingerprint recognition area when detecting an input signal to request fingerprint authentication, and providing a guide that induces a user to place the end of his or her finger in the outskirt of the fingerprint icon. The guide displayed in the outskirt of the fingerprint icon may be a guide corresponding to a fingerprint image having a high quality value among a plurality of fingerprint images obtained in a fingerprint registration process.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display, a fingerprint sensor disposed on one surface of the display, a memory, and a processor operatively connected to the display, the fingerprint sensor, and the memory. The processor may be configured to display a UI indicative of a fingerprint recognition area and/or a first guide line providing guidance of a first direction of a finger of a user by using the display, based on an input signal to request fingerprint registration being detected, obtain a first fingerprint image of the finger by using the fingerprint sensor based on the finger touching the fingerprint recognition area, store, in the memory, information indicative of the first guide line and the obtained first fingerprint image by mapping the information and the obtained first fingerprint image, display a second guide line providing guidance of a second direction of the finger by using the display after mapping and storing the information and the obtained first fingerprint image in the memory, obtain a second fingerprint image of the finger by using the fingerprint sensor based on the finger touching the fingerprint recognition area, and store, in the memory, information indicative of the second guide line and the obtained second fingerprint image by mapping the information and the obtained second fingerprint image.

In accordance with another aspect of the disclosure, an electronic device is provided. The electronic device includes a display, a fingerprint sensor disposed on one surface of the display, a memory storing a plurality of fingerprint images mapped to information indicative of a plurality of guide lines, and a processor operatively connected to the display, the fingerprint sensor, and the memory. The processor may be configured to display a first user interface (UI) indicative of a fingerprint recognition area and, as a second UI, a guide line corresponding to a fingerprint image having a high quality value among the plurality of fingerprint images stored in the memory by using the display, based on an input signal to request fingerprint authentication being detected, obtain a fingerprint image of a finger by using the fingerprint sensor based on the finger of a user touching the fingerprint recognition area, compare the obtained fingerprint image and a fingerprint image mapped to information indicative of the first UI and/or the second UI, and perform the fingerprint authentication based on the obtained fingerprint image and the mapped fingerprint image being identical with each other based on a result of the comparison.

In accordance with another aspect of the disclosure, a method of providing, by an electronic device, a fingerprint recognition guide is provided. The method includes displaying a first UI indicative of a fingerprint recognition area and, as a second UI, a guide line corresponding to a fingerprint image having a high quality value among a plurality of fingerprint images stored in a memory of the electronic device by using a display, based on an input signal to request fingerprint authentication being detected, obtaining a fingerprint image of a finger by using a fingerprint sensor disposed on one surface of the display based on the finger of a user touching the fingerprint recognition area, comparing the obtained fingerprint image and a fingerprint image mapped to information indicative of the first UI and/or the second UI, and performing the fingerprint authentication based on the obtained fingerprint image and the mapped fingerprint image being identical with each other, based on a result of the comparison.

Advantageous Effects of Invention

The electronic device according to various embodiments of the disclosure can reduce a deformation of an obtained fingerprint image and also improve fingerprint recognition performance because finger touch locations can be aligned upon fingerprint registration and fingerprint authentication by additionally providing a guide, corresponding to a fingerprint image having a high quality value and for inducing the end of a finger to be positioned in the outskirt of a fingerprint icon, in addition to the fingerprint icon indicative of a fingerprint recognition area when an input signal to request fingerprint authentication is detected.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 is a flowchart for describing a method of providing a guide for fingerprint registration according to an embodiment of the disclosure;

FIG. 11 is a flowchart for describing a method of providing a guide for fingerprint authentication according to an embodiment of the disclosure.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
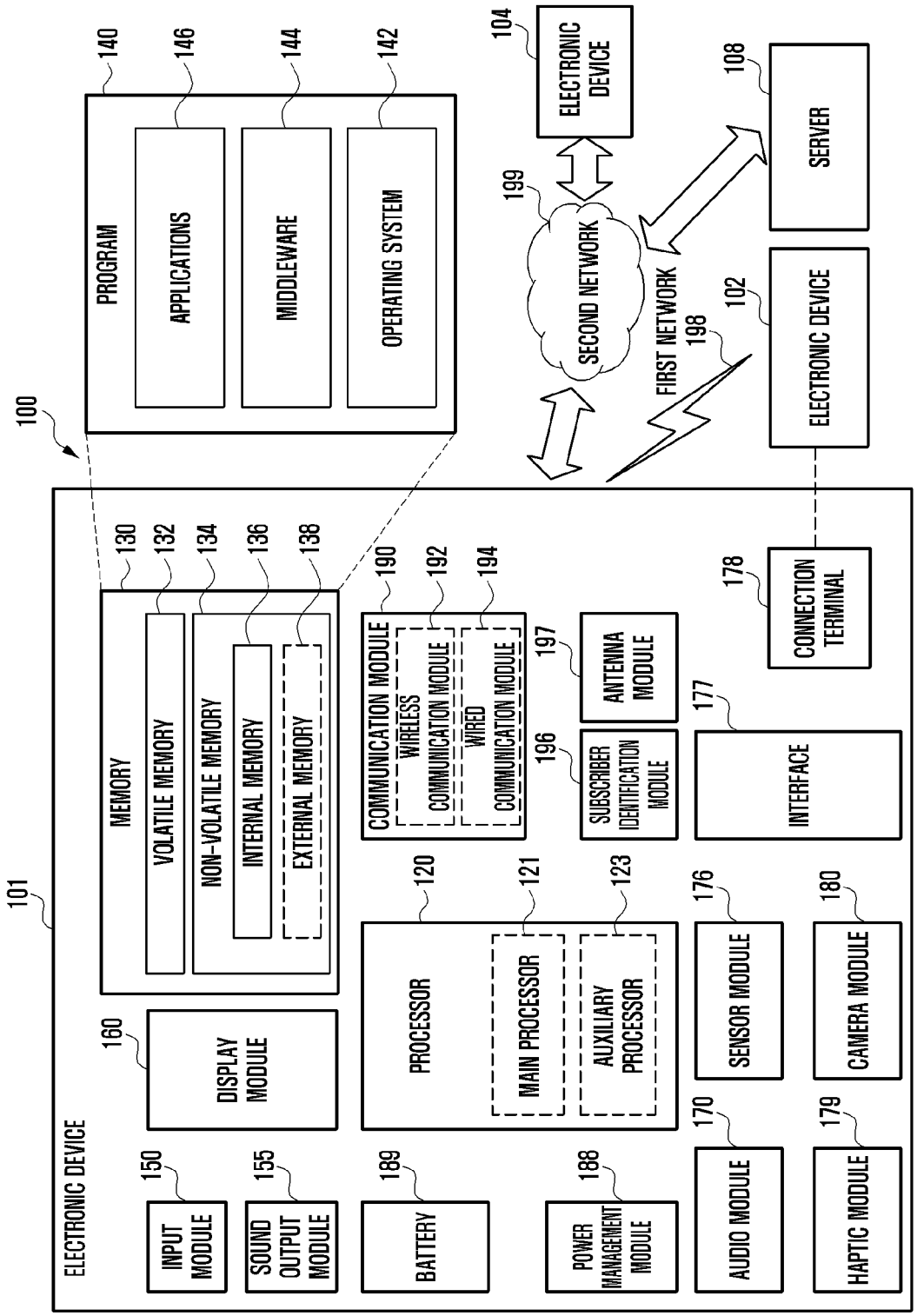
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
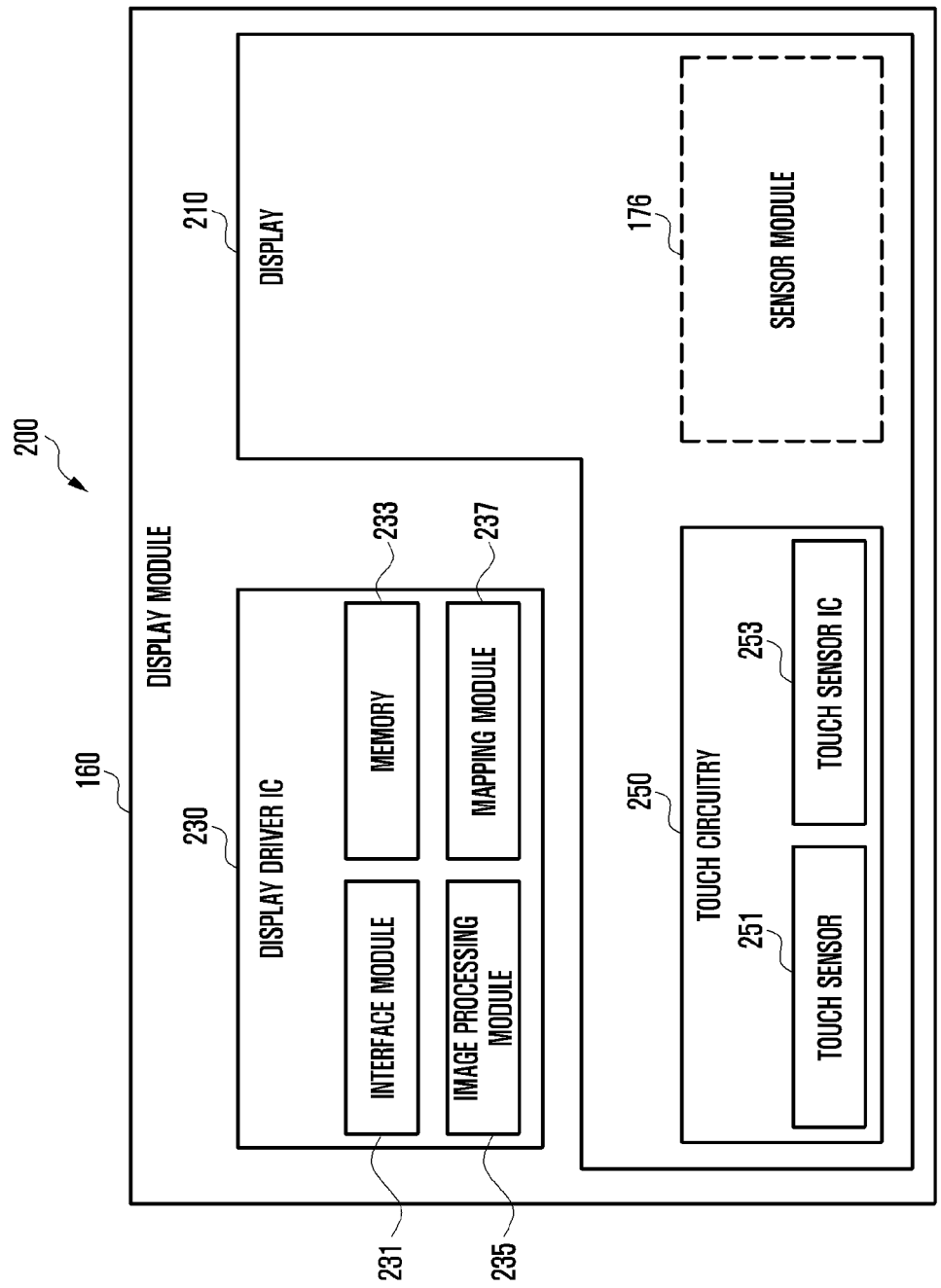
FIG. 2 is a block diagram of a display module according to an embodiment of the disclosure.

FIG. 2 is a block diagram illustrating the display module according to an embodiment of the disclosure.

Referring to FIG. 2, in the block 200, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as a red, green, blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
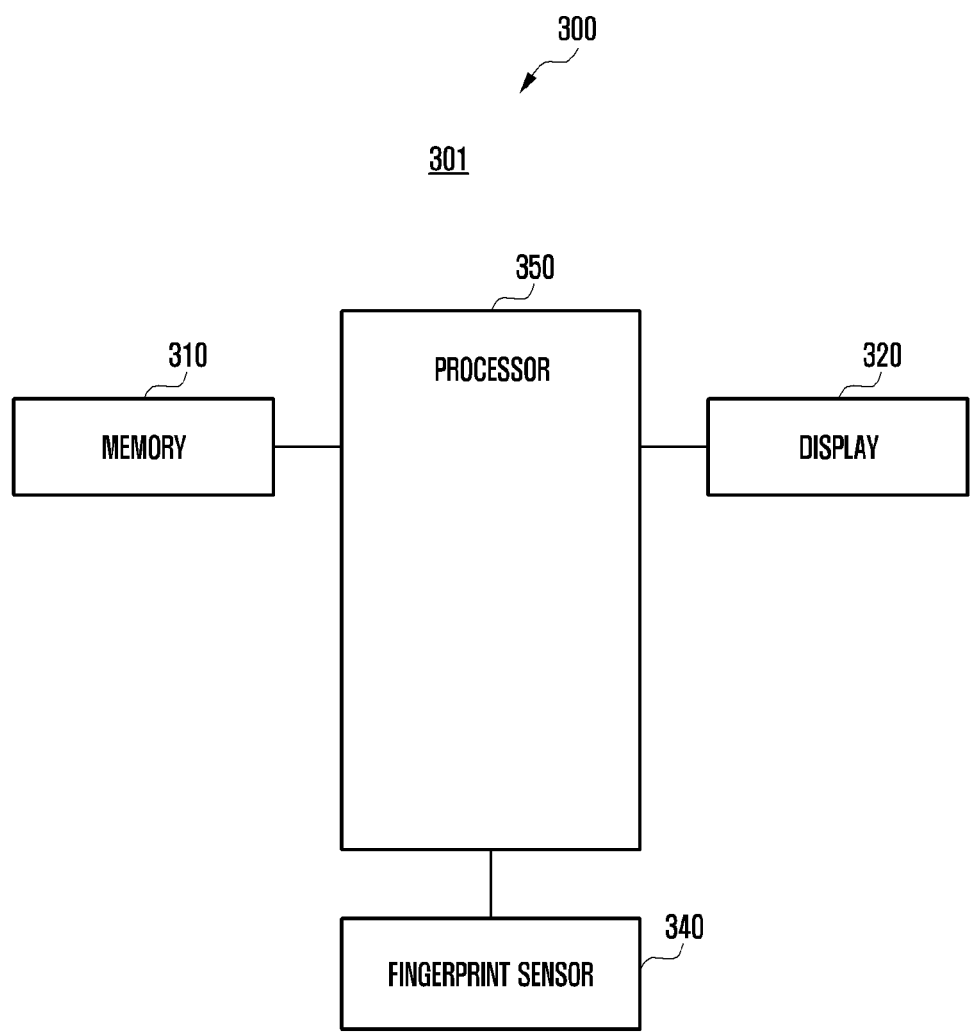
FIG. 3 is a block diagram illustrating an electronic device according to an embodiment of the disclosure.

FIG. 3 is a block diagram illustrating an electronic device according to an embodiment of the disclosure.

Referring to FIG. 3, in a block diagram 300, the electronic device 301 (e.g., the electronic device 101 in FIG. 1) may include a memory 310 (e.g., the memory 130 in FIG. 1), a display 320 (e.g., the display module 160 in FIG. 1), a fingerprint sensor 340 and/or a processor 350 (e.g., the processor 120 in FIG. 1).

In various embodiments, the memory 310 (e.g., the memory 130 in FIG. 1) may perform a function for storing a program (e.g., the program 140 in FIG. 1) for the processing and control of the processor 350 of the electronic device 301, an operating system (OS) (e.g., the operating system 142 in FIG. 1), and various applications and/or input/output data, and may store a program controlling an overall operation of the electronic device 301. The memory 310 may store various types of configuration information necessary upon processing of a function related to various embodiments of the disclosure in the electronic device 301.

In various embodiments, the memory 310 may include a security area. In an embodiment, the security area may store personal information related to a user and at least one piece of authentication information (e.g., fingerprint information, face information and/or iris information). In relation to the security area, various embodiments will be described with reference to FIG. 4 that is described later.

In various embodiments, the display 320 (e.g., the display module 160 in FIG. 1) may display an image under the control of the processor 350, and may be implemented as any one of a liquid crystal display (LCD), a light-emitting diode (LED) display, an organic light-emitting diode (OLED) display, or a micro electro mechanical systems (MEMS) display, an electronic paper display, or a flexible display, but the disclosure is not limited thereto.

In an embodiment, when an input signal to request fingerprint registration is detected, the display 320 may display a user interface (UI) indicative of a fingerprint recognition area (e.g., an area where the fingerprint sensor 340 is disposed) under the control of the processor 350. The display 320 may further sequentially display a plurality of guide lines that provides guidance of a direction of a finger of a user in proximity to the UI under the control of the processor 350.

In an embodiment, if an input signal to request fingerprint authentication is detected, the display 320 may display a first UI indicative of a fingerprint recognition area and display, as a second UI, a guide line corresponding to a fingerprint image having a high quality value among a plurality of fingerprint images stored in the memory 310 under the control of the processor 350.

In various embodiments, the fingerprint sensor 340 may recognize a fingerprint input by a user, and may obtain a fingerprint image (or a fingerprint characteristic) of a finger indicative of a characteristic difference unique to the user. For example, the fingerprint sensor 340 may extract a characteristic of the fingerprint from the obtained fingerprint image, and may provide the processor 350 with the characteristic as fingerprint information. For example, the characteristic of the fingerprint may include a distance between characteristic points of the fingerprint, a ratio of the ridges and valleys of the fingerprint and/or a width between the ridge and valley of the fingerprint.

In an embodiment, the fingerprint sensor 340 may be disposed in a part of the display 320 under the display 320 (e.g., an under panel). For example, when viewed from one surface where the display 320 is exposed to the outside, at least some areas of the fingerprint sensor 340 may be disposed to overlap each other, but the disclosure is not limited thereto. In an embodiment, the fingerprint sensor 340 may be implemented in an optical type way, an ultrasonic way and/or a capacitance way.

In various embodiments, the processor 350 (e.g., the processor 120 in FIG. 1) may include one or more of a central processing unit (CPU), an application processor (AP), or a communication processor (CP). The processor 350 may execute control of at least another constituent element of the electronic device 301 and/or an operation or data processing related to communication, for example.

In an embodiment, when an input signal to request fingerprint registration is detected, the processor 350 may display, on the display 320, a UI indicative of a fingerprint recognition area and/or a first guide line that provides guidance of a first direction of a finger of a user. For example, the fingerprint recognition area is an area where the fingerprint sensor 340 is disposed, and may mean an area where a fingerprint image of a finger can be substantially obtained. The first guide line that provides guidance of the first direction of the finger may be a graphic element for inducing the end of the finger of the user to be positioned in the graphic element (e.g., induces the end of the finger to be directed toward the first direction). When the finger touches the fingerprint recognition area, the processor 350 may obtain a first fingerprint image of the finger by using the fingerprint sensor 340. The processor 350 may store information indicative of the first guide line and the obtained first fingerprint image in the memory 310 (e.g., the security area of the memory 310) by mapping the information and the obtained first fingerprint image.

In an embodiment, the processor 350 may extract a characteristic of a fingerprint by analyzing an obtained first fingerprint image. The characteristic of the fingerprint may include a distance between characteristic points of the fingerprint, a ratio of the ridges and valleys of the fingerprint and/or a width between the ridge and valley of the fingerprint. The processor 350 may evaluate the quality (image quality (IQ)) of the first fingerprint image based on the extracted characteristic of the fingerprint. The processor 350 may calculate a quality value of the first fingerprint image according to a criterion predefined with respect to the first fingerprint image. For example, the characteristic of the fingerprint may include a first characteristic to a fourth characteristic. Each of the first characteristic to the fourth characteristic may be classified as the designated number of criteria (e.g., a criterion range). A score mapped to each of the criteria included in the designated number (e.g., criterion ranges) may be configured in each of the first characteristic to the fourth characteristic. The processor 350 may extract characteristics (e.g., the first characteristic to the fourth characteristic) of the fingerprint of the first fingerprint image, may identify a criterion corresponding to an extracted characteristic of the fingerprint among the designated number of criteria classified in the characteristics of the fingerprint, and may calculate a score mapped to the criterion. The processor 350 may calculate a quality value of the first fingerprint image by adding the calculated scores for the respective characteristics of the fingerprint. The processor 350 may store the calculated quality value of the first fingerprint image along with the information indicative of the first guide line and the obtained first fingerprint image, but the disclosure is not limited thereto. The processor 350 may further store touch information (e.g., touch coordinates, touch intensity, a touch area and/or a touch direction) received from a touch sensor (e.g., the touch sensor 251 in FIG. 2), based on a touch of the finger in the fingerprint recognition area being detected. When detecting that the touch of the finger is released from the touch recognition area based on touch information received through the touch sensor 251, the processor 350 may terminate the operation of obtaining the first fingerprint image.

In an embodiment, after terminating the operation of obtaining the first fingerprint image, the processor 350 may maintain the display of the UI indicative of the fingerprint recognition area, and may display a second guide line that provides guidance of a second direction of the finger, instead of the first guide line that provides guidance of the first direction of the finger. For example, the second direction of the finger may be a direction different from the first direction of the first guide line. When a finger touches the fingerprint recognition area, the processor 350 may obtain a second fingerprint image of the finger by using the fingerprint sensor 340. The processor 350 may store information indicative of the second guide line and the obtained second fingerprint image in the memory 310 by mapping the information and the obtained second fingerprint image. The processor 350 may extract a characteristic of a fingerprint by analyzing the obtained second fingerprint image, and may calculate a quality value of the second fingerprint image according to a predefined criterion based on the extracted characteristic of the fingerprint. The processor 350 may store the calculated quality value of the second fingerprint image along with the information indicative of the second guide line and the obtained second fingerprint image, but the disclosure is not limited thereto. The processor 350 may further store touch information (e.g., touch coordinates, touch intensity, a touch area and/or a touch direction) received from the touch sensor 251, based on a touch of the finger in the fingerprint recognition area being detected. The processor 350 may store the touch information in the memory 310 in order of a fingerprint image having a high quality value, based on the quality value of the first fingerprint image and the quality value of the second fingerprint image. When detecting that the touch of the finger is released from the touch recognition area based on touch information received through the touch sensor 251, the processor 350 may terminate the operation of obtaining the second fingerprint image.

In an embodiment, when an input signal to request fingerprint authentication is detected, the processor 350 may display a first UI indicative of the fingerprint recognition area and a second UI (e.g., a guide line for providing guidance of a direction of a finger) corresponding to a fingerprint image having a high quality value among a plurality of fingerprint images stored in the memory 310. When a finger touches the fingerprint recognition area, the processor 350 may obtain a fingerprint image of the finger by using the fingerprint sensor 340. The processor 350 may compare the fingerprint image obtained by using the fingerprint sensor 340 and a fingerprint image mapped to information indicative of the first UI and/or the second UI. When the obtained fingerprint image and the fingerprint image mapped to the information indicative of the first UI and/or the second UI are identical with each other based on a result of the comparison, the processor 350 may perform the fingerprint authentication.

The electronic device 301 according to various embodiments may include the display 320, the fingerprint sensor 340 disposed on one surface of the display 320, the memory 310, and the processor 350 operatively connected to the display 320, the fingerprint sensor 340, and the memory 310. The processor 350 may be configured to display a UI indicative of a fingerprint recognition area and/or a first guide line that provides guidance of a first direction of a finger of a user by using the display 320 when an input signal to request fingerprint registration is detected, obtain a first fingerprint image of the finger by using the fingerprint sensor 340 when the finger touches the fingerprint recognition area, store, in the memory 310, information indicative of the first guide line and the obtained first fingerprint image by mapping the information and the obtained first fingerprint image, display a second guide line that provides guidance of a second direction of the finger by using the display 320 after mapping and storing the information and the obtained first fingerprint image in the memory 310, obtain a second fingerprint image of the finger by using the fingerprint sensor 340 when the finger touches the fingerprint recognition area, and store, in the memory 310, information indicative of the second guide line and the obtained second fingerprint image by mapping the information and the obtained second fingerprint image.

In various embodiments, the UI is an area where the fingerprint sensor 340 is disposed, and may include a graphic element for providing guidance so that the center of the finger is positioned in the graphic element.

In various embodiments, the first guide line and the second guide line may be displayed in a way to be isolated from the UI at a designated interval, and each may include a graphic element for providing guidance so that the end of the finger is positioned in the graphic element.

The processor 350 according to various embodiments may be configured to extract a characteristic of a fingerprint by analyzing the obtained first fingerprint image and to calculate a quality value of the first fingerprint image according to a predefined criterion based on the extracted characteristic of the fingerprint.

The processor 350 according to various embodiments may be configured to extract a first characteristic for whether the directionality of the ridges and valleys of the fingerprint is constant based on the directionality of ridges and valleys of the fingerprint, a second characteristic for a disconnection degree of the fingerprint, a third characteristic for a ratio occupied by a lumped portion when the lumped portion is present in the first fingerprint image and/or a fourth characteristic for a ratio occupied by an unfocused portion when the unfocused portion is present in the first fingerprint image.

The processor 350 according to various embodiments may be configured to extract a characteristic of a fingerprint by analyzing the obtained second fingerprint image, calculate a quality value of the second fingerprint image according to a predefined criterion based on the extracted characteristic of the fingerprint and to store the first fingerprint image and the second fingerprint image in the memory 310 in order of a fingerprint image having a high quality value, based on the quality value of the first fingerprint image and the quality value of the second fingerprint image.

The processor 350 according to various embodiments may be configured to further store touch information based on a touch of the finger, which is received from the touch sensor 251, based on the touch of the finger being detected in the fingerprint recognition area.

In various embodiments, the touch information may include at least one of touch coordinates, touch intensity, a touch area, or a touch direction.

The processor 350 according to various embodiments may be configured to maintain the display of the UI indicative of the fingerprint recognition area after mapping and storing the information indicative of the first guide line and the obtained first fingerprint image in the memory 310 and to display the second guide line that provides guidance of the second direction of the finger instead of the first guide line that provides guidance of the first direction of the finger.

The electronic device 301 according to various embodiments may include the display 320, the fingerprint sensor 340 disposed on one surface of the display 320, the memory 310 storing a plurality of fingerprint images mapped to information indicative of a plurality of guide lines, and the processor 350 operatively connected to the display 320, the fingerprint sensor 340, and the memory 310. The processor 350 may be configured to display a first UI indicative of a fingerprint recognition area and, as a second UI, a guide line corresponding to a fingerprint image having a high quality value among the plurality of fingerprint images stored in the memory 310 by using the display 320 when an input signal to request fingerprint authentication is detected, obtain a fingerprint image of a finger by using the fingerprint sensor 340 when the finger of a user touches the fingerprint recognition area, compare the obtained fingerprint image and a fingerprint image mapped to information indicative of the first UI and/or the second UI, and perform the fingerprint authentication when the obtained fingerprint image and the mapped fingerprint image are identical with each other based on a result of the comparison.

In various embodiments, the first UI is an area where the fingerprint sensor 340 is disposed, and may include a graphic element for providing guidance so that the center of the finger is positioned in the graphic element.

In various embodiments, the second UI is displayed in a way to be isolated from the first UI at a designated interval, and may include a graphic element for providing guidance so that the end of the finger is positioned in the graphic element.

The processor 350 according to various embodiments may be configured to display the first UI indicative of the fingerprint recognition area and a third UI corresponding to a fingerprint image having a lower quality value than the fingerprint image of the second UI among the plurality of fingerprint images stored in the memory 310 by using the display 320 when the obtained fingerprint image and the fingerprint image mapped to the information indicative of the first UI and/or the second UI are not identical with each other based on a result of the comparison.

The processor 350 according to various embodiments may be configured to store a result of the fingerprint authentication in the memory 310.

The processor 350 according to various embodiments may display, as the second UI, a guide line having a high quality value and having a high fingerprint authentication success rate based on a result of the fingerprint authentication among the plurality of fingerprint images stored in the memory 310 when the input signal to request the fingerprint authentication is detected.

The processor 350 according to various embodiments may be configured to check a fingerprint image whose number of times used for the fingerprint authentication is high among the plurality of fingerprint images stored in the memory 310 when the input signal to request the fingerprint authentication is detected, identify a direction of a fingerprint of the fingerprint image whose number of times used for the fingerprint authentication is high, and display, as the second UI, a guide line corresponding to the identified direction of the fingerprint and corresponding to a fingerprint image having a high quality value among the plurality of fingerprint images stored in the memory.

Figure 4:
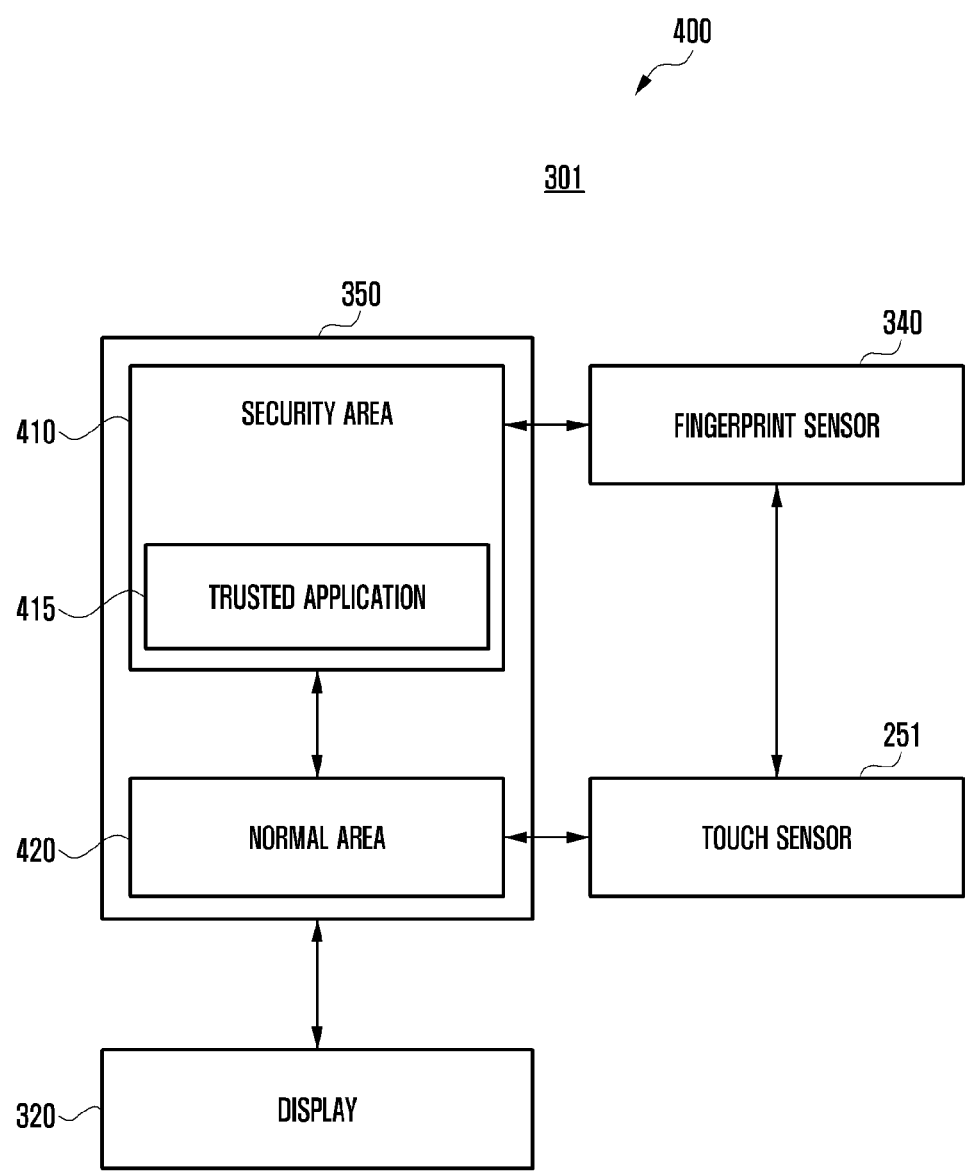
FIG. 4 is a diagram illustrating a connection relation between a touch sensor, a display, a fingerprint sensor, and a processor according to an embodiment of the disclosure.

FIG. 4 is a diagram illustrating a connection relation between the touch sensor, the display, the fingerprint sensor, and the processor according to an embodiment of the disclosure.

Referring to FIG. 4, in a diagram 400, an electronic device (e.g., the electronic device 301 in FIG. 3) may include a fingerprint sensor (e.g., the fingerprint sensor 340 in FIG. 3). The fingerprint sensor 340 may be implemented in an ultrasonic way or an optical type way, but the disclosure is not limited thereto.

In an embodiment, an electrical path (or an interface) through which signals (or data) may be transmitted to and received from a touch sensor (e.g., the touch sensor 251 in FIG. 2) may be formed in (or connected to) the fingerprint sensor 340. The touch sensor 251 may be connected to a processor (e.g., the processor 350 in FIG. 3) through an electrical path, and may deliver, to the processor 350, touch information for a touch on a display (e.g., the display 320 in FIG. 3). The touch sensor 251 may deliver the touch information to the fingerprint sensor 340 through the processor 350 or may directly deliver the touch information to the fingerprint sensor 340. In an embodiment, the touch information may include at least one of touch coordinates, touch intensity, a touch area, or a touch direction.

In an embodiment, the display 320 may include a pressure sensor (not illustrated). The touch sensor 251 may obtain touch intensity by pressure information obtained from the pressure sensor configured to measure the intensity of a force generated by a touch. In another embodiment, the processor 350 or a display driver IC (e.g., the display driver IC 230 in FIG. 2) may directly calculate the final touch intensity based on touch information received from the touch sensor 251 and/or pressure information obtained from the pressure sensor.

In an embodiment, when detecting a finger touch in a fingerprint recognition area (e.g., an area where the fingerprint sensor 340 is disposed), the touch sensor 251 may deliver touch information for the finger touch to the fingerprint sensor 340 and/or the processor 350. If the fingerprint sensor 340 is implemented in an ultrasonic way, the fingerprint sensor 340 may output ultrasonic waves based on touch information received from the touch sensor 251. The fingerprint sensor 340 may obtain a fingerprint image by recognizing a fingerprint based on a reflected wave for the outputted ultrasonic waves. If the fingerprint sensor 340 is implemented in an optical type way, the processor 350 may control the display 320 to output a light source (not illustrated) for a fingerprint scan based on touch information received from the touch sensor 251. The fingerprint sensor 340 may obtain a fingerprint image by scanning a fingerprint based on reflected light for light outputted through the light source (not illustrated).

In various embodiments, the processor 350 may control an overall operation related to fingerprint recognition, may receive touch information from the touch sensor 251, and may deliver the touch information to the fingerprint sensor 340. The processor 350 may be logically divided into a security area 410 and a normal area 420. The security area 410 (e.g., a trust zone or a secure area) is an area having high security (or reliability), and may mean a trusted execution environment (TEE). The security area 410 may include a trusted application (TA) 415. The normal area 420 (e.g., a normal zone) is an area having lower security than the security area 410, and may mean a rich execution environment (REE).

In an embodiment, the processor 350 may separate the security area 410 and the normal area 420, and may store or manage, in the security area 410, information that requires high security, such as bio information (e.g., a fingerprint or an iris), payment information (e.g., a card number or a valid period), or a company security document. The processor 350 may control the exchange of information managed by the security area 410 with the normal area 420, and may control the trusted application 415 to be safely executed. The trusted application 415 is software which may be driven in the TEE, and may include a fingerprint recognition application, for example. The security area 410 may be connected to the fingerprint sensor 340 through a secure path.

FIG. 5 is a flowchart for describing a method of providing a guide for fingerprint registration according to an embodiment of the disclosure.

Referring to FIG. 5, in a method 500, in operation 510, a processor (e.g., the processor 350 in FIG. 3) of an electronic device (e.g., the electronic device 301 in FIG. 3) may display, on a display (e.g., the display 320 in FIG. 3), a user interface (UI) indicative of a fingerprint recognition area and/or a first guide line that provides guidance of a first direction of a finger of a user when an input signal to request fingerprint registration is detected.

In various embodiments, the fingerprint recognition area is an area where a fingerprint sensor (e.g., the fingerprint sensor 340 in FIG. 3) is disposed, and may mean an area where a fingerprint image of a finger may be substantially obtained. The UI indicative of the fingerprint recognition area may mean a graphic element (e.g., a graphic element including an image materialized from a fingerprint) that provides guidance so that fingerprint recognition may be performed through the area where the fingerprint sensor 340 is disposed.

In an embodiment, the processor 350 may display, on the display 320, the UI indicative of the fingerprint recognition area in the area where the fingerprint sensor 340 is disposed so that a user is induced to position the center of his or her finger in the fingerprint recognition area.

In various embodiments, the first guide line that provides guidance of the first direction of the finger of the user may be a graphic element for inducing the user to position the end of the finger (e.g., induce the end of the finger to be directed toward the first direction) in the graphic element. Through the UI and the first guide line displayed on the display 320, the user may position the finger so that the end of the finger is directed towards the first direction based on the first guide line while positioning the center of the finger in the UI.

In an embodiment, in operation 520, when the finger touches the fingerprint recognition area, the processor 350 may obtain a first fingerprint image of the finger by using the fingerprint sensor 340. In operation 530, the processor 350 may store information indicative of the first guide line and the obtained first fingerprint image by mapping the information and the obtained first fingerprint image. For example, the information indicative of the first guide line may include index information of the first guide line, information on a location where the first guide line is displayed and/or direction information of the first guide line. For example, in order to obtain a fingerprint image, a plurality of guide lines may be sequentially displayed. The index information of the first guide line may be index information on the sequence in which the first guide line among the plurality of guide lines is displayed. The information on the location where the first guide line is displayed may be information on coordinates in which the first guide line is displayed in the display 320. The direction information of the first guide line may be direction information (e.g., a first direction) for inducing the end of the finger to be positioned, but the disclosure is not limited thereto.

In an embodiment, the first fingerprint image may be encrypted by a security area (e.g., the security area 410 in FIG. 4) and stored in the memory 310. For example, the first fingerprint image may be encrypted by the security area 410 and stored in a security area of the memory 310. The security area of the memory 310 may be the same as or similar to the security area 410 of the processor 350.

In various embodiments, although not illustrated, the processor 350 may extract a characteristic of a fingerprint by analyzing the obtained first fingerprint image. The characteristic of the fingerprint may include information on a distribution of ridges and valleys of the fingerprint, for example, a distance between characteristic points of the fingerprint, a ratio of the ridges and valleys of the fingerprint, a width between the ridge and valley of the fingerprint and/or an overlap degree of the ridge and valley.

In an embodiment, the processor 350 may evaluate quality of the first fingerprint image (image quality, IQ) based on the extracted characteristic of the fingerprint. For example, the processor 350 may calculate a quality value of the first fingerprint image according to a criterion predefined with respect to the first fingerprint image. For example, the processor 350 may identify a first characteristic for whether the directionality of ridges and valleys of the fingerprint is constant based on the directionality of the ridges and the valleys. Furthermore, for example, the processor 350 may identify a second characteristic for a disconnection degree of the fingerprint. Furthermore, for example, the processor 350 may identify whether a lumped portion is present in the first fingerprint image as the fingerprint is damp, and may identify a third characteristic for a ratio occupied by the lumped portion if the lumped portion is present. Furthermore, for example, the processor 350 may identify whether an unfocused portion is present in the first fingerprint image as the fingerprint is dry, and may identify a fourth characteristic for a ratio occupied by the unfocused portion if the unfocused portion is present, but the disclosure is not limited thereto.

In an embodiment, the processor 350 may calculate a quality value of the first fingerprint image according to a predefined criterion based on at least one of the aforementioned characteristics of the fingerprint, for example, the first characteristic to the fourth characteristic. For example, each of the first characteristic to the fourth characteristic may be classified as the designated number of criteria (e.g., a criterion range). A score corresponding to each of the criteria (e.g., the criterion ranges) of the designated number may be configured in each of the first characteristic to the fourth characteristic. For example, the first characteristic for the directionality of ridges and valleys of the fingerprint is for determining a flow of the ridge, and may be classified as the designated number of criteria depending on whether the direction of the ridge is regular or suddenly changed. A score corresponding to each of the criteria included in the designated number may be configured in the first characteristic. Furthermore, for example, the second characteristic for a disconnection degree of the fingerprint may be classified as the designated number of criteria. A score corresponding to each of the criteria included in the designated number may be configured in the second characteristic. Furthermore, for example, the third characteristic for a ratio occupied by the lumped portion may be classified as the designated number of criteria. A score corresponding to each of the criteria included in the designated number may be configured in the third characteristic. Furthermore, for example, the fourth characteristic for a ratio occupied by the unfocused portion may be classified as the designated number of criteria. A score corresponding to each of the criteria included in the designated number may be configured in the fourth characteristic. The processor 350 may identify each of the characteristics of the first fingerprint image, and may calculate a score corresponding to each of criteria of each characteristic. The processor 350 may calculate a quality value of the first fingerprint image by adding the calculated scores corresponding to the criteria of each characteristic.

In an embodiment, the processor 350 may store the calculated quality value of the first fingerprint image along with the information indicative of the first guide line and the obtained first fingerprint image, but the disclosure is not limited thereto. The processor 350 may further store touch information (e.g., touch coordinates, touch intensity, a touch area and/or a touch direction) received from a touch sensor (e.g., the touch sensor 251 in FIG. 2), based on the touch of the finger in the fingerprint recognition area being detected.

Operation 530 according to various embodiments may be performed in the security area 410.

In various embodiments, when detecting that the touch of the finger is released from the touch recognition area based touch information received through the touch sensor 251, the processor 350 may terminate the operation of obtaining the first fingerprint image and perform operation 540 that is described later.

In an embodiment, in operation 540, the processor 350 may display a second guide line that provides guidance of a second direction of the finger. For example, the second direction of the finger may be a direction different from the first direction of the first guide line displayed in operation 510. For example, operation 540 may be an operation of displaying the second guide line that provides guidance of the second direction of the finger instead of the first guide line that provides guidance of the first direction of the finger while maintaining the display of the UI indicative of the fingerprint recognition area.

In an embodiment, the second guide line that provides guidance of the second direction of the finger of the user may be a graphic element for inducing the user to direct the end of the finger toward the second direction. Through the UI and the second guide line displayed on the display 320, the user may position the finger so that the end of the finger is directed toward the second direction based on the second guide line while the center of the finger is positioned in the UI.

In an embodiment, in operation 550, when the finger touches the fingerprint recognition area, the processor 350 may obtain a second fingerprint image of the finger by using the fingerprint sensor 340. In operation 560, the processor 350 may map and store information indicative of the second guide line and the obtained second fingerprint image. The information indicative of the second guide line may include index information of the second guide line (e.g., index information on the sequence in which the second guide line among a plurality of guide lines is displayed), information on a location where the second guide line is displayed (e.g., information on coordinates in which the second guide line is displayed on the display 320) and/or direction information of the second guide line (e.g., direction information (e.g., the second direction) for inducing the end of the finger to be positioned). For example, the second fingerprint image may be encrypted by the security area 410 and stored in the memory 310.

In an embodiment, although not illustrated, the processor 350 may extract a characteristic of a fingerprint by analyzing the obtained second fingerprint image. The characteristic of the fingerprint may include a first characteristic for whether the directionality of ridges and valleys of the fingerprint is constant based on the directionality of the ridges and the valleys, a second characteristic for a disconnection degree of the fingerprint, a third characteristic for a ratio occupied by a lumped portion in the second fingerprint image and/or a fourth characteristic for a ratio occupied by an unfocused portion in the second fingerprint image. The processor 350 may calculate a quality value of the second fingerprint image according to a predefined criterion based on at least one of the aforementioned characteristics of the fingerprint, for example, the first characteristic to the fourth characteristic. A method of calculating the quality value of the second fingerprint image is the same as the aforementioned method of calculating the quality value of the first fingerprint image, and a detailed description of an operation of calculating the quality value of the second fingerprint image is omitted.

In an embodiment, the processor 350 may store the calculated quality value of the second fingerprint image along with the information indicative of the second guide line and the obtained second fingerprint image, but the disclosure is not limited thereto. The processor 350 may further store touch information (e.g., touch coordinates, touch intensity, a touch area and/or a touch direction) received from the touch sensor 251, based on a touch of the finger in the fingerprint recognition area being detected.

Operation 560 according to various embodiments may be performed in the security area 410.

In various embodiments, although not illustrated, the processor 350 may store the first fingerprint image and the second fingerprint image in the memory 310 in order of a fingerprint image having a high quality value based on the quality value of the first fingerprint image obtained in operation 520 and the quality value of the second fingerprint image obtained in operation 550.

In various embodiments, when detecting that the touch of the finger is released from the touch recognition area based on touch information received through the touch sensor 251, the processor 350 may terminate operation of obtaining the second fingerprint image.

In various embodiments, the aforementioned operation of obtaining a fingerprint image and the aforementioned operation of mapping and storing the obtained fingerprint image and information indicative of a corresponding guide line may be performed by the designated number of times (e.g., 9 times). For example, if nine fingerprint images are configured to be obtained, the aforementioned operation of obtaining a fingerprint image and the aforementioned operation of mapping and storing the obtained fingerprint image and information indicative of a corresponding guide line may be repeatedly performed nine times. As the operation of obtaining a fingerprint image is performed by the designated number of times, the processor 350 may obtain a plurality of fingerprint images (e.g., nine fingerprint images) for one finger joint, but the disclosure is not limited thereto. The processor 350 may further perform an operation of obtaining a plurality of fingerprint images for another finger joint.

In relation to the operation of performing, by the designated number of times, the aforementioned operation of obtaining a fingerprint image and the aforementioned operation of mapping and storing the obtained fingerprint image and information indicative of a corresponding guide line according to various embodiments, various embodiments will be described with reference to FIGS. 6A and 6B that are described later.

Figure 6A:
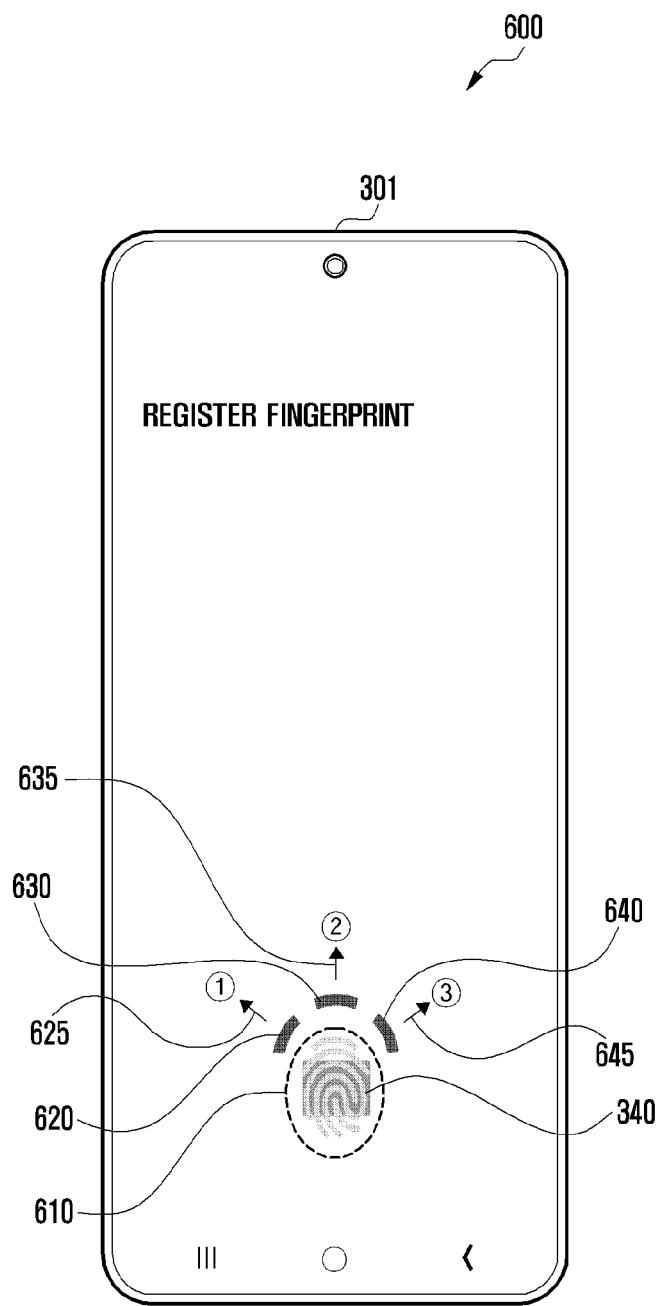
FIG. 6A is a diagram for describing a UI indicative of a fingerprint recognition area for fingerprint registration and a UI providing guidance of a direction of a finger according to an embodiment of the disclosure.

FIG. 6A is a diagram for describing a UI indicative of a fingerprint recognition area and a UI providing guidance of a direction of a finger in the electronic device 301 according to an embodiment of the disclosure.

In various embodiments, when an input signal to request fingerprint registration is detected, a processor (e.g., the processor 350 in FIG. 3) of an electronic device (e.g., the electronic device 301 in FIG. 3) may display a user interface (UI) indicative of a fingerprint recognition area in an area where a fingerprint sensor (e.g., the fingerprint sensor 340 in FIG. 3) is disposed. The processor 350 may additionally sequentially display a plurality of UIs for providing guidance of a direction of the end of a finger, for example, a plurality of guide lines, in the UI indicative of the fingerprint recognition area.

Referring to FIG. 6A, in a diagram 600, when an input signal to request fingerprint registration is detected, the processor 350 of the electronic device 301 may display, on a display (e.g., the display 320 in FIG. 3), a UI 610 indicative of a fingerprint recognition area and/or a first guide line 620 that provides guidance of a first direction 625 of a finger. The fingerprint recognition area is an area where the fingerprint sensor 340 is disposed, and may mean an area where a fingerprint image of the finger can be substantially obtained. When detecting a touch of the finger of a user on the fingerprint recognition area, the processor 350 may obtain a first fingerprint image of the finger by using the fingerprint sensor 340, and may store, in the memory (e.g., the memory 310 in FIG. 3), the obtained first fingerprint image and information indicative of the first guide line 620 (e.g., index information of the first guide line 620 (e.g., index information on the sequence in which the first guide line 620 among a plurality of guide lines is displayed), information on a location where the first guide line 620 is displayed (e.g., information on coordinates in which the first guide line 620 is displayed on the display 320) and/or direction information of the first guide line 620 (e.g., direction information (e.g., the first direction) for inducing the end of the finger to be positioned)) by mapping the obtained first fingerprint image and the information, but the disclosure is not limited thereto. The processor 350 may store a quality value of the first fingerprint image and/or touch information based on a touch of the finger which is obtained from a touch sensor (e.g., the touch sensor 251 in FIG. 2), along with the first fingerprint image and the information indicative of the first guide line 620.

In an embodiment, after mapping and storing the first fingerprint image and the information indicative of the first guide line 620, the processor 350 may display, on the display 320, a second guide line 630 that provides guidance of a second direction 635 of the finger. The second direction 635 of the second guide line 630 may be a direction different from the first direction 625 of the first guide line 620. For example, the processor 350 may display the second guide line 630 that provides guidance of the second direction 635 of the finger instead of the first guide line 620 that provides guidance of the first direction 625 of the finger, while maintaining the display of the UI 610 indicative of the fingerprint recognition area.

In an embodiment, when a touch of the finger of the user on the fingerprint recognition area is detected, the processor 350 may obtain a second fingerprint image of the finger by using the fingerprint sensor 340, and may store, in the memory 310, the obtained second fingerprint image and information indicative of the second guide line 630 (e.g., index information of the second guide line 630 (e.g., index information of the sequence in which the second guide line 630 among a plurality of guide lines is displayed), information on a location where the second guide line 630 is displayed (e.g., information on coordinates in which the second guide line 630 is displayed on the display 320) and/or direction information of the second guide line 630 (e.g., direction information (e.g., the second direction) for inducing the end of the finger to be positioned) by mapping the obtained second fingerprint image and the information, but the disclosure is not limited thereto. The processor 350 may store a quality value of the second fingerprint image and/or touch information based on a touch of the finger which is obtained from the touch sensor 251, along with the second fingerprint image and the information indicative of the second guide line 630.

In an embodiment, after mapping and storing the second fingerprint image and the information indicative of the second guide line 630, the processor 350 may display, on the display 320, a third guide line 640 that provides guidance of a third direction 645 of the finger. The third direction 645 of the third guide line 640 may be a direction different from the second direction 635 of the second guide line 630. For example, the processor 350 may display the third guide line 640 that provides guidance of the third direction 645 of the finger instead of the second guide line 630 that provides guidance of the second direction 635 of the finger, while maintaining the display of the UI 610 indicative of the fingerprint recognition area.

In an embodiment, if a touch of the finger of the user on the fingerprint recognition area is detected, the processor 350 may obtain a third fingerprint image of the finger by using the fingerprint sensor 340, and may store, in the memory 310, the obtained third fingerprint image and information indicative of the third guide line 640 (e.g., index information of the third guide line 640 (e.g., index information on the sequence in which the third guide line 640 among a plurality of guide lines is displayed), information on a location where the third guide line 640 is displayed (e.g., information on coordinates in which the third guide line 640 is displayed in the display 320) and/or direction information of the third guide line 640 (e.g., direction information (e.g., the third direction) for inducing the end of the finger to be positioned) by mapping the obtained third fingerprint image and the information, but the disclosure is not limited thereto. The processor 350 may store a quality value of the third fingerprint image and/or touch information based on a touch of the finger which is obtained from the touch sensor 251, along with the third fingerprint image and the information indicative of the third guide line 640.

In various embodiments, a UI that provides guidance of a direction of a finger displayed on the display 320, for example, a guide line is more specifically described with reference to FIG. 6B that is described later.

Figure 6B:
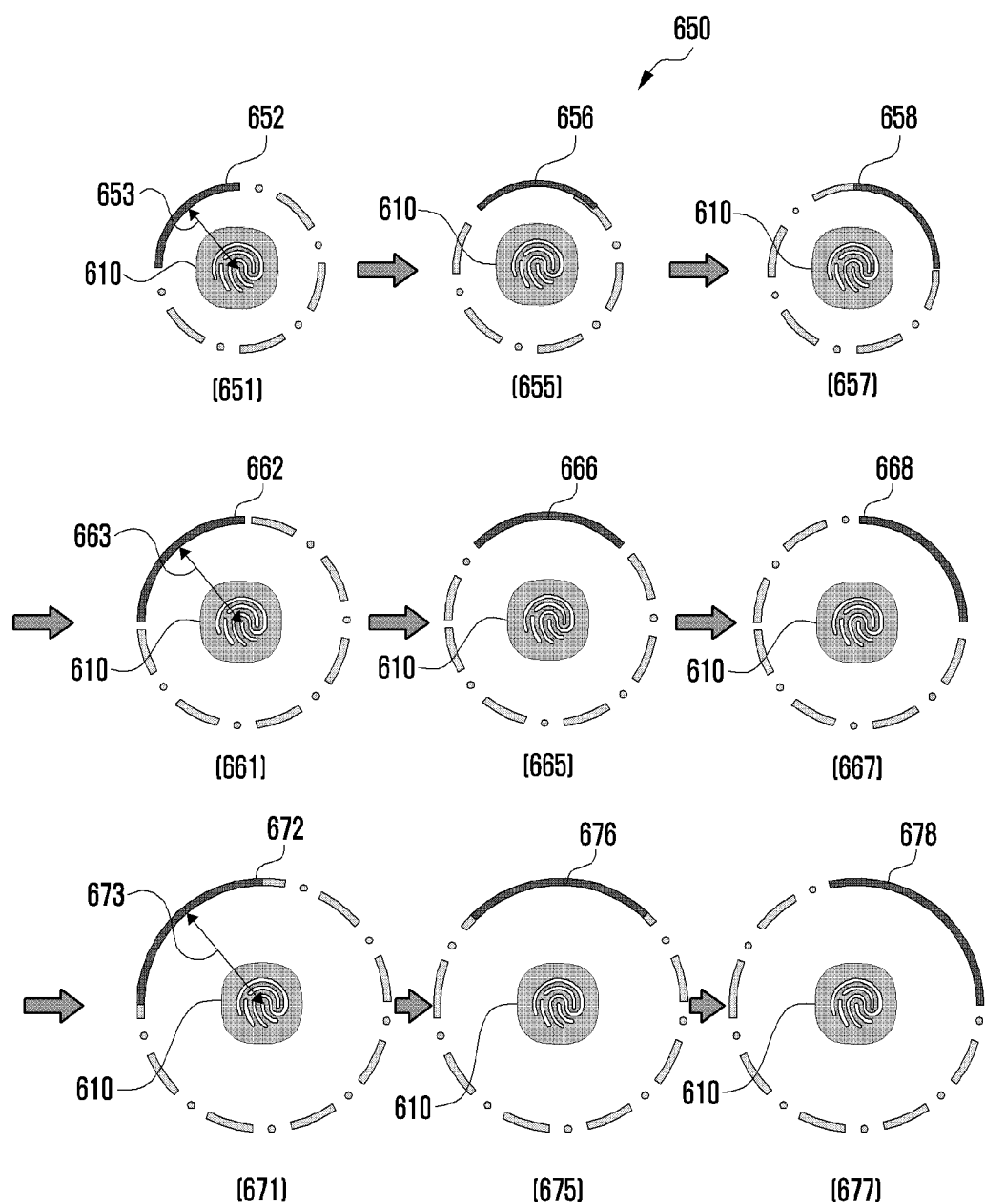
FIG. 6B is a diagram for describing a UI indicative of a fingerprint recognition area and a UI providing guidance of a direction of a finger according to an embodiment of the disclosure.

FIG. 6B is a diagram for describing a UI indicative of a fingerprint recognition area and a UI providing guidance of a direction of a finger in the electronic device 301 according to an embodiment of the disclosure.

In various embodiments, when an input signal to request fingerprint registration is detected, a processor (e.g., the processor 350 in FIG. 3) of an electronic device (e.g., the electronic device 301 in FIG. 3) may be configured to obtain a plurality of fingerprint images for one finger joint. In FIG. 6B according to various embodiments, it is assumed and described that nine fingerprint images are configured to be obtained with respect to one finger joint.

Referring to FIG. 6B, in diagram 650, the processor 350 may additionally sequentially display a plurality of UIs for providing guidance of directions of the end of a finger, for example, a plurality of guide lines 652, 656, 658, 662, 666, 668, 672, 676, and 678 in a UI 610 indicative of a fingerprint recognition area along reference numerals <651>, <655>, <657>, <661>, <665>, <667>, <671>, <675>, and <677>.

In an embodiment, as illustrated in reference numeral <651>, when an input signal to request fingerprint registration is detected, the processor 350 may display the UI 610 indicative of a fingerprint recognition area (e.g., an area where a fingerprint sensor (e.g., the fingerprint sensor 340 in FIG. 3) is disposed) and/or a first guide line 652 that provides guidance of a first direction (e.g., the first direction 625 in FIG. 6A) of a finger of a user. The processor 350 may obtain a first fingerprint image through the fingerprint sensor 340 based on a touch of the finger being detected in the UI 610. The processor 350 may store the obtained first fingerprint image and information indicative of the first guide line 652 (e.g., index information of the first guide line 652, information on a location where the first guide line 652 is displayed and/or direction information of the first guide line 652) by mapping the obtained first fingerprint image and the information, but the disclosure is not limited thereto. The processor 350 may store a quality value of the first fingerprint image and/or touch information based on the touch of the finger which is obtained by a touch sensor (e.g., the touch sensor 251 in FIG. 2), along with the first fingerprint image and the information indicative of the first guide line 652.

In an embodiment, after mapping and storing the first fingerprint image and the information indicative of the first guide line 652, the processor 350 may display a second guide line 656 that provides guidance of a second direction (e.g., 635 in FIG. 6A) of the finger instead of the first guide line 652, while maintaining the display of the UI 610 indicative of the fingerprint recognition area, as illustrated in reference numeral <655>. The processor 350 may obtain a second fingerprint image through the fingerprint sensor 340 based on a touch of the finger being detected in the UI 610. The processor 350 may store the obtained second fingerprint image and information indicative of the second guide line 656 (e.g., index information of the second guide line 656, information on a location where the second guide line 656 is displayed and/or direction information of the second guide line 656) by mapping the obtained second fingerprint image and the information, but the disclosure is not limited thereto. The processor 350 may store a quality value of the second fingerprint image and/or touch information based on a touch of the finger which is obtained from the touch sensor 251, along with the second fingerprint image and the information indicative of the second guide line 656.

In an embodiment, after mapping and storing the second fingerprint image and the information indicative of the second guide line 656, the processor 350 may display a third guide line 658 that provides guidance of a third direction (e.g., 645 in FIG. 6A) of the finger instead of the second guide line 656, while maintaining the display of the UI 610 indicative of the fingerprint recognition area, as illustrated in reference numeral <657>. The processor 350 may obtain a third fingerprint image through the fingerprint sensor 340 based on a touch of the finger being detected in the UI 610. The processor 350 may store the obtained third fingerprint image and information indicative of the third guide line 658 (e.g., index information of the third guide line 658, information on a location where the third guide line 658 is displayed and/or direction information of the third guide line 658) by mapping the obtained third fingerprint image and the information, but the disclosure is not limited thereto, the processor 350 may store a quality value of the third fingerprint image and/or touch information based on the touch of the finger which is obtained from the touch sensor 251, along with the third fingerprint image and the information indicative of the third guide line 640.

The first guide line 652, the second guide line 656, and the third guide line 658 illustrated in reference numeral <651>, <655>, and <657> according to various embodiments may be displayed in a way to be isolated from the center of the UI 610 indicative of the fingerprint recognition area by a first distance 653.

In an embodiment, after mapping and storing the third fingerprint image and the information indicative of the third guide line 640, the processor 350 may display a fourth guide line 662 that provides guidance of a first direction (e.g., 635 in FIG. 6A) of the finger instead of the third guide line 658, while maintaining the display of the UI 610 indicative of the fingerprint recognition area, as illustrated in reference numeral <661>. The processor 350 may obtain a fourth fingerprint image through the fingerprint sensor 340 based on a touch of the finger being detected in the UI 610. The processor 350 may store the obtained fourth fingerprint image and information indicative of the fourth guide line 662 (e.g., index information of the fourth guide line 662, information on a location where the fourth guide line 662 is displayed and/or direction information of the fourth guide line 662) by mapping the fourth fingerprint image and the information, but the disclosure is not limited thereto. The processor 350 may store a quality value of the fourth fingerprint image and/or touch information based on the touch of the finger which is obtained from the touch sensor 251, along with the fourth fingerprint image and the information indicative of the fourth guide line 662.

In an embodiment, after mapping and storing the fourth fingerprint image and the information indicative of the fourth guide line 662, the processor 350 may display a fifth guide line 666 that provides guidance of a second direction (e.g., 635 in FIG. 6A) of the finger instead of the fourth guide line 662, while maintaining the display of the UI 610 indicative of the fingerprint recognition area, as illustrated in reference numeral <665>. The processor 350 may obtain a fifth fingerprint image through the fingerprint sensor 340 based on a touch of the finger being detected in the UI 610. The processor 350 may store the obtained fifth fingerprint image and information indicative of the fifth guide line 666 (e.g., index information of the fifth guide line 666, information on a location where the fifth guide line 666 is displayed and/or direction information of the fifth guide line 666) by mapping the obtained fifth fingerprint image and the information, but the disclosure is not limited thereto. The processor 350 may store a quality value of the fifth fingerprint image and/or touch information based on the touch of the finger which is obtained from the touch sensor 251, along with the fifth fingerprint image and the information indicative of the fifth guide line 666.

In an embodiment, after mapping and storing the fifth fingerprint image and the information indicative of the fifth guide line 666, the processor 350 may display a sixth guide line 668 that provides guidance of a third direction (e.g., 645 in FIG. 6A) of the finger instead of the fifth guide line 666, while maintaining the display of the UI 610 indicative of the fingerprint recognition area, as illustrated in reference numeral <667>. The processor 350 may obtain a sixth fingerprint image through the fingerprint sensor 340 based on a touch of the finger being detected in the UI 610. The processor 350 may store the obtained sixth fingerprint image and information indicative of the sixth guide line 668 (e.g., index information of the sixth guide line 668, information on a location where the sixth guide line 668 is displayed and/or direction information of the sixth guide line 668) by mapping the obtained sixth fingerprint image and the information, but the disclosure is not limited thereto. The processor 350 may store a quality value of the sixth fingerprint image and/or touch information based on the touch of the finger which is obtained from the touch sensor 251, along with the sixth fingerprint image and the information indicative of the sixth guide line 668.

The fourth guide line 662, the fifth guide line 666, and the sixth guide line 668 illustrated in reference numeral <661>, <665>, and <667> according to various embodiments may be displayed in a way to be isolated from the center of the UI 610 indicative of the fingerprint recognition area by a second distance 663. For example, the second distance 663 may be greater than the first distance 653.

In an embodiment, after mapping and storing the information indicative of the sixth fingerprint image and the sixth guide line 668, the processor 350 may display a seventh guide line 672 that provides guidance of a first direction (e.g., 635 in FIG. 6A) of the finger instead of the sixth guide line 668, while maintaining the display of the UI 610 indicative of the fingerprint recognition area, as illustrated in reference numeral <671>. The processor 350 may obtain a seventh fingerprint image through the fingerprint sensor 340 based on a touch of the finger being detected in the UI 610. The processor 350 may store the obtained seventh fingerprint image and information indicative of the seventh guide line 672 (e.g., index information of the seventh guide line 672, information on a location where the seventh guide line 672 is displayed and/or direction information of the seventh guide line 672) by mapping the obtained seventh fingerprint image and the information, but the disclosure is not limited thereto. The processor 350 may store a quality value of the seventh fingerprint image and/or touch information based on the touch of the finger which is obtained from the touch sensor 251, along with the seventh fingerprint image and the information indicative of the seventh guide line 672.

In an embodiment, after mapping and storing the seventh fingerprint image and the information indicative of the seventh guide line 672, the processor 350 may display an eighth guide line 676 that provides guidance of a second direction (e.g., 635 in FIG. 6A) of the finger instead of the seventh guide line 672, while maintaining the display of the UI 610 indicative of the fingerprint recognition area, as illustrated in reference numeral <675>. The processor 350 may obtain an eighth fingerprint image through the fingerprint sensor 340 based on a touch of the finger being detected in the UI 610. The processor 350 may store the obtained eighth fingerprint image and information indicative of the eighth guide line 676 (e.g., index information of the eighth guide line 676, information on a location where the eighth guide line 676 is displayed and/or direction information of the eighth guide line 676) by mapping the obtained eighth fingerprint image and the information, but the disclosure is not limited thereto. The processor 350 may store a quality value of the eighth fingerprint image and/or touch information based on the touch of the finger which is obtained from the touch sensor 251, along with the eighth fingerprint image and the information indicative of the eighth guide line 676.

In an embodiment, after mapping and storing the eighth fingerprint image and the information indicative of the eighth guide line 676, the processor 350 may display a ninth guide line 678 that provides guidance of a third direction (e.g., 645 in FIG. 6A) of the finger instead of the eighth guide line 676, while maintaining the display of the UI 610 indicative of the fingerprint recognition area, as illustrated in reference numeral <677>. The processor 350 may obtain a ninth fingerprint image through the fingerprint sensor 340 based on a touch of the finger being detected in the UI 610. The processor 350 may store the obtained ninth fingerprint image and information indicative of the ninth guide line 678 (e.g., index information of the ninth guide line 678, information on a location where the ninth guide line 678 is displayed and/or direction information of the ninth guide line 678) by mapping the obtained ninth fingerprint image and the information, but the disclosure is not limited thereto. The processor 350 may store a quality value of the ninth fingerprint image and/or touch information based on the touch of the finger which is obtained from the touch sensor 251, along with the ninth fingerprint image and the information indicative of the ninth guide line 678.

The seventh guide line 672, the eighth guide line 676, and the ninth guide line 678 illustrated in reference numeral <671>, <675>, and <677> according to various embodiments may be displayed in a way to be isolated from the center of the UI 610 indicative of the fingerprint recognition area by a third distance 673. For example, the third distance 673 may be greater than the second distance 663.

In various embodiments, although not illustrated, the processor 350 may store, in the memory 310, fingerprint images (e.g., the first fingerprint image to the ninth fingerprint image) obtained through the fingerprint sensor 340 in order of a higher quality value based on quality values of the respective fingerprint images. This may be an operation for providing a UI corresponding to a fingerprint image having a high quality value (e.g., one guide line of the first guide line 652 to the ninth guide line 678) among a plurality of fingerprint images (e.g., the first fingerprint image to the ninth fingerprint image) stored in the memory 310, when an input signal for performing fingerprint authentication is detected in FIG. 8 that is described later.

In various embodiments, after obtaining a plurality of fingerprint images for one finger joint, the processor 350 may further perform an operation of obtaining a plurality of fingerprint images for another finger joint. In this case, the processor 350 may additionally sequentially display a plurality of UIs for providing guidance of directions of the end of the finger, for example, a plurality of guide lines 652, 656, 658, 662, 666, 668, 672, 676, and 678 in the UI 610 indicative of the fingerprint recognition area along reference numeral <651>, <655>, <657>, <661>, <665>, <667>, <671>, <675>, and <677>.

Figure 7:
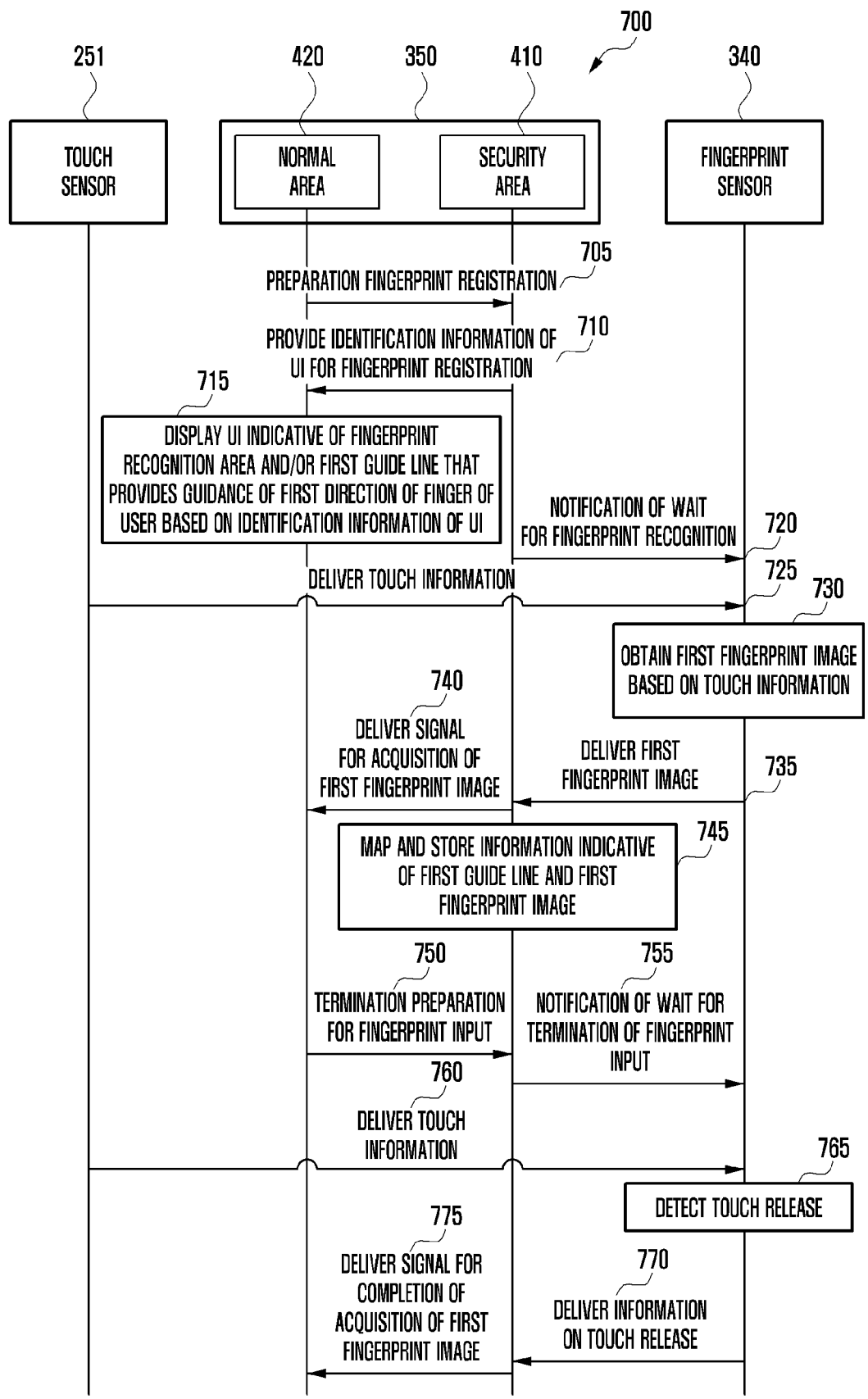
FIG. 7 is a diagram for describing a method of providing a guide for fingerprint registration according to an embodiment of the disclosure.

FIG. 7 is a diagram for describing a method of providing a guide for fingerprint registration according to an embodiment of the disclosure.

An operation of a security area (e.g., the security area 410 in FIG. 4) of a processor (e.g., the processor 350 in FIG. 3) in FIG. 7 according to various embodiments may be performed by a trusted application (e.g., the trusted application 415 in FIG. 4).

Referring to FIG. 7, in a method 700, in operation 705, when an input signal to request fingerprint registration is detected, a normal area (e.g., the normal area 420 in FIG. 4) of the processor 350 may transmit, to the security area 410, a signal to request preparation for fingerprint registration.

In an embodiment, in operation 710, the security area 410 may provide identification information of a UI for fingerprint registration based on the signal to request preparation for fingerprint registration being received from the normal area 420. For example, as described with reference to FIG. 6B, when the signal to request preparation for fingerprint registration is received, the security area 410 may be configured to sequentially display UIs that are isolated from the UI 610 indicative of a fingerprint recognition area (e.g., an area where a fingerprint sensor (e.g., the fingerprint sensor 340 in FIG. 3) is disposed)) by designated distances (e.g., a first distance (e.g., the first distance 653 in FIG. 6B), a second distance (e.g., the second distance 663 in FIG. 6B), and a third distance (e.g., the third distance 673 in FIG. 6B)) and that provide guidance of different directions (e.g., a first direction (e.g., the first direction 625 in FIG. 6A), a second direction (e.g., the second direction 635 in FIG. 6A), and a third direction (e.g., the third direction 645 in FIG. 6A)), for example, guide lines (e.g., sequentially display the first guide line 652 to the ninth guide line 678 along reference numeral <651>, <655>, <657>, <661>, <665>, <667>, <671>, <675>, and <677>) (e.g., sequentially display the first guide line 652 to the ninth guide line 678 based on index information of a plurality of guide lines, respectively). In this case, the security area 410 may transmit, to the normal area 420, identification information of corresponding guide lines (e.g., index information of the guide lines) so that UIs along reference numeral <651>, <655>, <657>, <661>, <665>, <667>, <671>, <675>, and <677>, for example, guide lines are displayed based on the signal to request preparation for fingerprint registration being received from the normal area 420.

In an embodiment, in operation 715, the normal area 420 may display a UI (e.g., the UI 610 in FIGS. 6A and 6B) indicative of the fingerprint recognition area and/or a UI that provides guidance of a first direction of a finger of a user, for example, a first guide line (e.g., the first guide line 620 in FIG. 6A or the first guide line 652 in FIG. 6B), based on the identification information of a UI received from the security area 410.

In various embodiments, operation 710 of providing identification information of a UI for fingerprint registration may be omitted. For example, although identification information of a UI for fingerprint registration is not received from the security area 410, the normal area 420 may sequentially display the UI 610 and UIs along reference numeral <651>, <655>, <657>, <661>, <665>, <667>, <671>, <675>, and <677>, for example, the first guide line 652 to the ninth guide line 678.

In an embodiment, in operation 720, the security area 410 may notify the fingerprint sensor 340 that the fingerprint sensor 340 waits for fingerprint recognition.

In an embodiment, when a touch sensor (e.g., the touch sensor 251 in FIG. 2) detects a touch of a finger in a fingerprint recognition area (e.g., UI 610), in operation 725, the electronic device 301 may deliver, to the fingerprint sensor 340, touch information for the touch of the finger. The user may have a part of the finger come into contact with the fingerprint recognition area displayed in at least one area of a display (e.g., the display 320 in FIG. 3) for the fingerprint registration. In this case, the touch sensor 251 may detect the touch information based on a part of the finger coming into contact with the display 320. The touch information may include touch coordinates, touch intensity, a touch area and/or a touch direction.

In an embodiment, in operation 730, the fingerprint sensor 340 may obtain a first fingerprint image based on the touch information. In operation 735, the fingerprint sensor 340 may deliver the obtained first fingerprint image to the security area 410. In operation 740, the security area 410 may deliver, to the normal area 420, a signal for the acquisition of the first fingerprint image. In operation 745, the security area 410 may store information indicative of the first guide line (e.g., index information of the first guide line (e.g., index information on the sequence in which the first guide line among a plurality of guide lines is displayed), information on a location where the first guide line is displayed (e.g., information on coordinates in which the first guide line is displayed in the display 320) and/or direction information of the first guide line (e.g., direction information for inducing the end of the finger to be positioned)) and the first fingerprint image by mapping the information and the first fingerprint image. For example, the first fingerprint image may be encrypted by the security area 410 and stored in the memory 310.

In various embodiments, although not illustrated, the security area 410 may extract a characteristic of a fingerprint by analyzing the obtained first fingerprint image. The characteristic of the fingerprint may include a first characteristic for whether the directionality of ridges and valleys of the fingerprint is constant based on the directionality of the ridges and the valleys, a second characteristic for a disconnection degree of the fingerprint, a third characteristic for a ratio occupied by a lumped portion in the first fingerprint image and/or a fourth characteristic for a ratio occupied by an unfocused portion in the first fingerprint image. The security area 410 may calculate a quality value of the first fingerprint image according to a predefined criterion based on the aforementioned characteristic of the fingerprint, for example, at least one of the first characteristic to the fourth characteristic. The security area 410 may store the quality value of the first fingerprint image along with the information indicative of the first guide line and the obtained first fingerprint image. Although not illustrated, the security area 410 may receive, from the touch sensor 251, touch information (e.g., touch coordinates, touch intensity, a touch area and/or a touch direction) based on the finger touch, and may further store the received touch information based on the finger touch.

In an embodiment, in operation 750, the normal area 420 may transmit, to the security area 410, a signal to request termination preparation for the fingerprint input based on the signal for the acquisition of the first fingerprint image received from the security area 410. In operation 755, the security area 410 may transmit, to the fingerprint sensor 340, notification that provides notification of a wait for the termination of the fingerprint input.

In an embodiment, in operation 760, the touch sensor 251 may deliver the touch information to the fingerprint sensor 340. For example, the touch sensor 251 may detect that the finger coming into contact with at least one area of the display 320 is released, and may deliver corresponding touch information to the fingerprint sensor 340. For example, the touched finger being released may mean an operation of having, by a user, his or her finger come into contact with at least one area of the display 320 for fingerprint recognition and then taking away the finger. In operation 765, the fingerprint sensor 340 may detect the touch release based on the touch information received from the touch sensor 251. For example, the fingerprint sensor 340 may recognize that the touch of the finger for the fingerprint registration has been released based on the touch release being detected. In operation 770, the fingerprint sensor 340 may deliver information on the touch release to the security area 410. In operation 775, the security area 410 may deliver, to the normal area 420, a signal for the completion of the acquisition of the first fingerprint image.

In various embodiments, after obtaining the first fingerprint image, the electronic device 301 may repeatedly perform operation 705 to operation 775. For example, the electronic device 301 may sequentially display UIs indicative of directions of a finger along reference numeral <655>, <657>, <661>, <665>, <667>, <671>, <675>, and <677> described with reference to FIG. 6B, for example, the second guide line to the ninth guide line, and may obtain a plurality of fingerprint images (e.g., the second fingerprint image to the ninth fingerprint image) by repeatedly performing operation 705 to operation 775.

In various embodiments, the electronic device 301 (e.g., the security area 410) may obtain the first fingerprint image to the ninth fingerprint image, and may calculate quality values of the first fingerprint image to the ninth fingerprint image, respectively. The security area 410 may store, in the memory 310, the fingerprint images (e.g., the first fingerprint image to the ninth fingerprint image) obtained through the fingerprint sensor 340 in order of a higher quality value based on quality values of the respective fingerprint images.

Figure 8:
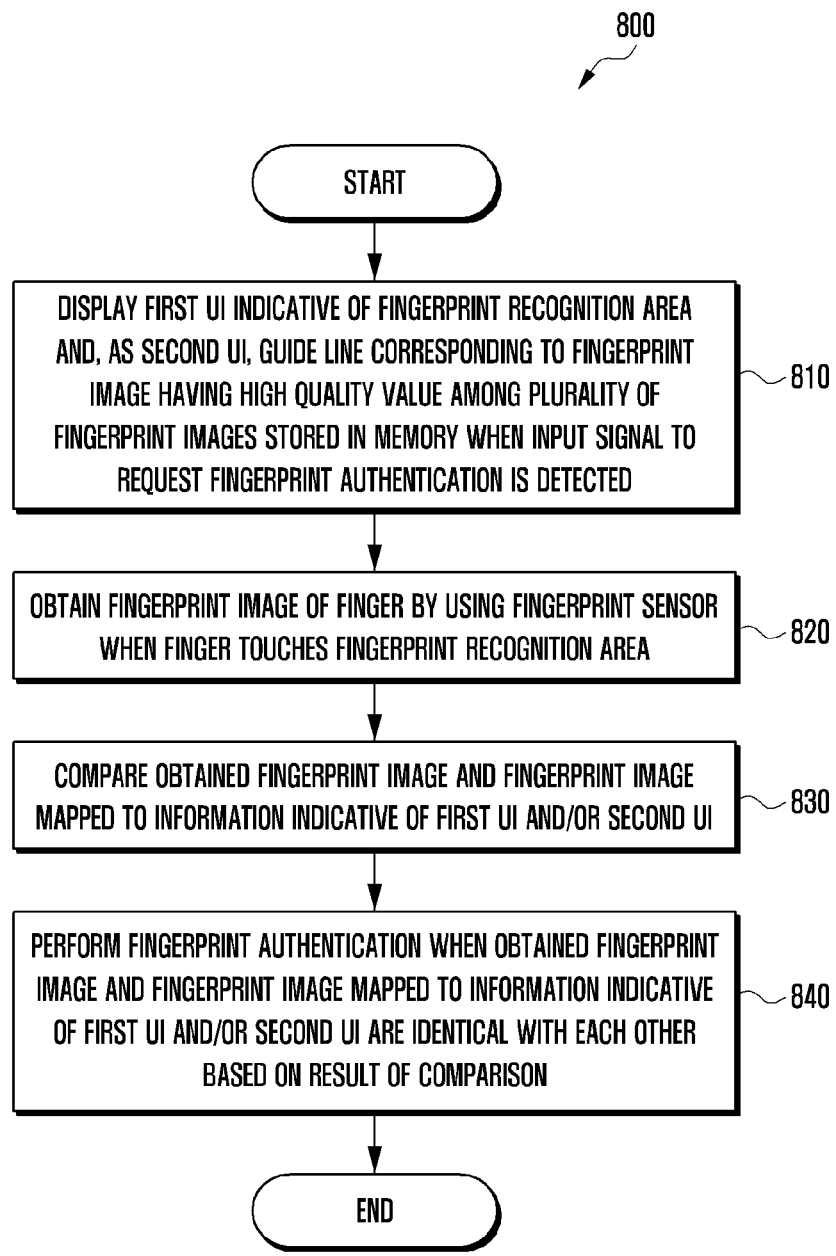
FIG. 8 is a flowchart for describing a method of providing a guide for fingerprint authentication according to an embodiment of the disclosure.

FIG. 8 is a flowchart for describing a method of providing a guide for fingerprint authentication according to an embodiment of the disclosure.

Referring to FIG. 8, in a method 800, in operation 810, when an input signal to request fingerprint authentication is detected, a processor (e.g., the processor 350 in FIG. 3) of an electronic device (e.g., the electronic device 301 in FIG. 3) may display a first UI indicative of a fingerprint recognition area (e.g., the UI 610 in FIGS. 6A and 6B) and, as a second UI, a guide line corresponding to a fingerprint image having a high quality value among a plurality of fingerprint images stored in the memory (e.g., the memory 310 in FIG. 3).

The input signal to request fingerprint authentication according to various embodiments may include an input for releasing a lock screen, an input for account authentication (e.g., a login) in a given website, or an input for using a payment service (e.g., payment or financial transactions).

In an embodiment, the fingerprint recognition area is an area where a fingerprint sensor (e.g., the fingerprint sensor 340 in FIG. 3) is disposed, and may mean an area where a fingerprint image of a finger can be substantially obtained.

In an embodiment, a plurality of fingerprint images for one finger joint through the aforementioned fingerprint registration operation in FIGS. 5, 6A, 6B, and 7 may be stored in the memory 310. The plurality of fingerprint images may be stored in the memory 310 in order of a higher quality value.

In an embodiment, the processor 350 may display a UI (e.g., the first UI 610) and a guide line for providing guidance of a direction of a finger corresponding to a fingerprint image having a high quality value (e.g., a fingerprint image having a high order) among a plurality of fingerprint images, for example, a second UI, based on the input signal to request fingerprint authentication being detected. For example, the processor 350 may determine that a fingerprint image having a high quality value among a plurality of fingerprint images stored in the memory 310 has a high fingerprint recognition rate, and may provide, as a second UI, a guide line for providing guidance of a corresponding direction of the finger. In an embodiment, the second UI may be one of the first guide line 652 to the ninth guide line 678 in FIG. 6B.

In an embodiment, in operation 820, when a finger touches the fingerprint recognition area, the processor 350 may obtain a fingerprint image of the finger by using a fingerprint sensor (e.g., the fingerprint sensor 340 in FIG. 3).

In an embodiment, in operation 830, the processor 350 may compare the obtained fingerprint image and a fingerprint image mapped to information (e.g., information indicative of a guide line corresponding to a fingerprint image having a high quality value among the first guide line 652 to the ninth guide line 678) indicative of the first UI and/or the second UI. For example, the security area 410 may decode the fingerprint image stored in the memory 310 and mapped to the information indicative of the second UI, and may compare the decoded fingerprint image with a fingerprint image obtained through the fingerprint sensor 340.

In an embodiment, in operation 840, the processor 350 may perform fingerprint authentication when the obtained fingerprint image and the fingerprint image mapped to the information indicative of the first UI and/or the second UI are identical with each other based on a result of the comparison.

In various embodiments, if a fingerprint image is obtained through the fingerprint sensor 340 as a finger is touched in the fingerprint recognition area, the time required may be long and a fingerprint recognition rate may also be low in performing the fingerprint authentication because the obtained fingerprint image and all fingerprint images stored in the memory 310 are compared.

In various embodiments, the time required can be reduced in performing fingerprint authentication by preferentially comparing a fingerprint image obtained through the fingerprint sensor 340 and a fingerprint image corresponding to information indicative of a guide line because a second UI corresponding to a fingerprint image having a high quality value among a plurality of fingerprint images stored in the memory 310, for example, the guide line is provided in addition to a first UI. The provided guide line is a guide line corresponding to a fingerprint image having a high quality value, and thus may also have a high fingerprint recognition rate.

In various embodiments, although not illustrated, the processor 350 may store information on a result of fingerprint authentication. For example, the processor 350 may store a result of fingerprint authentication performed by using a provided guide line, for example, information on a fingerprint authentication success or a fingerprint authentication failure along with information indicative of the corresponding guide line.

Thereafter, in a user authentication operation, the processor 350 may provide, as a second UI, a guide line in which information on a result of fingerprint authentication is further taken into consideration in addition to a high quality value.

Figure 9:
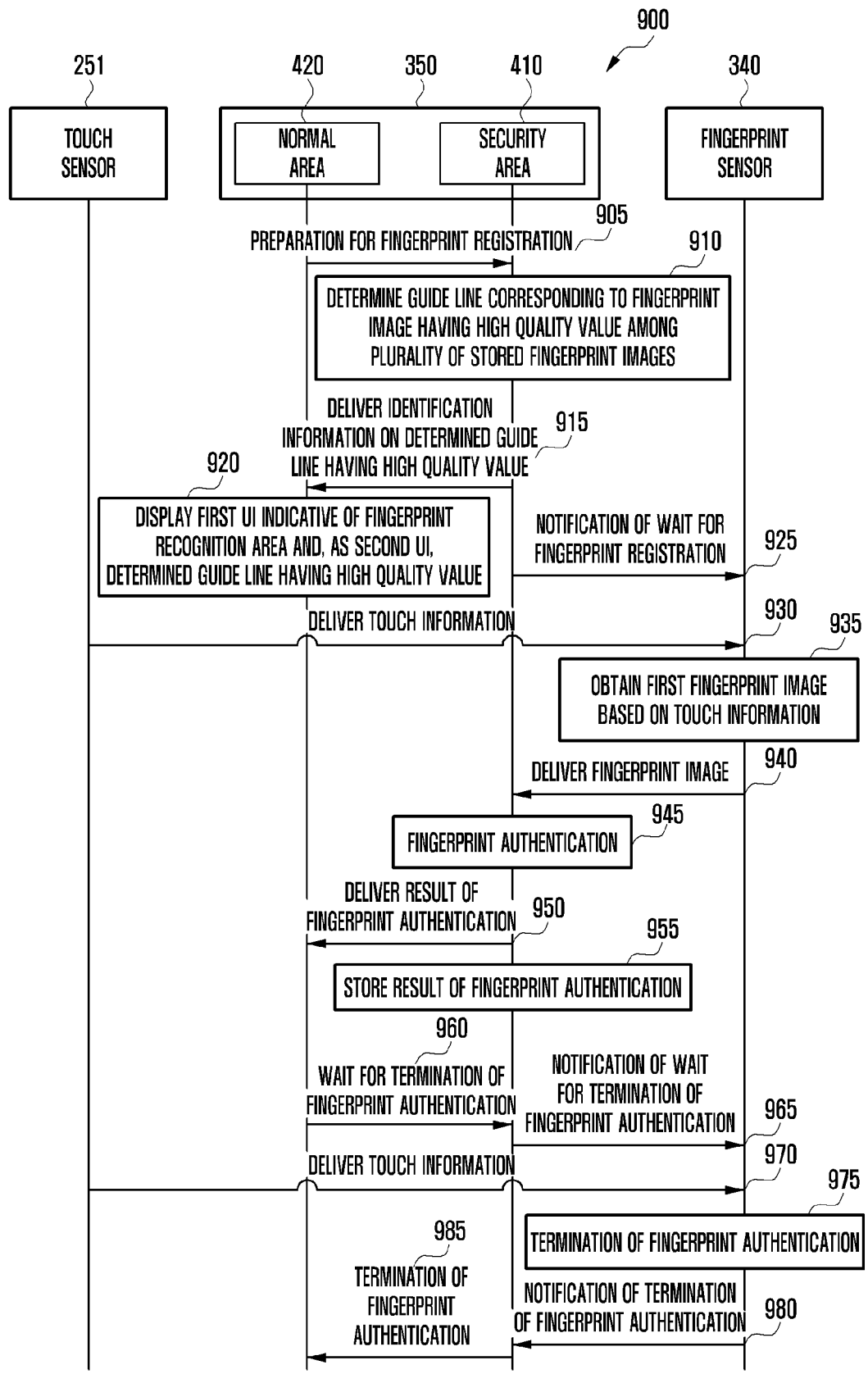
FIG. 9 is a diagram for describing a method of providing a guide for fingerprint authentication according to an embodiment of the disclosure.

FIG. 9 is a diagram for describing a method of providing a guide for fingerprint authentication according to an embodiment of the disclosure.

An operation of a security area (e.g., the security area 410 in FIG. 4) of a processor (e.g., the processor 350 in FIG. 3) in FIG. 9 according to various embodiments may be performed through a trusted application (e.g., the trusted application 415 in FIG. 4).

Referring to FIG. 9, in a method 900, in operation 905, when an input signal to request fingerprint authentication is detected, a normal area (e.g., the normal area 420 in FIG. 4) of the processor 350 may transmit, to the security area 410 of the processor 350, a signal to request preparation for fingerprint authentication. For example, the fingerprint authentication may be requested when an operation, such as lock release, account authentication, payment, or financial transactions of an electronic device (e.g., the electronic device 301 in FIG. 3), is performed based on a user input or the execution of an operation of an executed application.

In an embodiment, in operation 910, the security area 410 may determine a guide line corresponding to a fingerprint image having a high quality value among a plurality of fingerprint images stored in a memory (e.g., the memory 310 in FIG. 3). In operation 915, the security area 410 may deliver, to the normal area 420, identification information on the determined guide line (e.g., index information of the guide line) having a high quality value. For example, a plurality of fingerprint images (e.g., the first fingerprint image to the ninth fingerprint image mapped to the information indicative of the first guide line 652 to the ninth guide line 678 described with reference to FIG. 6B) for one finger joint through the fingerprint registration operation FIGS. 5, 6A, 6B, and 7 may be stored in the memory 310. The plurality of fingerprint images may be stored in the memory 310 in order of a higher quality value. The security area 410 may deliver, to the normal area 420, identification information of any one guide line having a high quality value among the first guide line 652 to the ninth guide line 678 described with reference to FIG. 6B.

In an embodiment, in operation 920, the normal area 420 may display, on the display 320, a first UI indicative of a fingerprint recognition area and, as a second UI, the guide line having a high quality value which is received from the security area 410, based on the identification information of the guide line received from the security area 410.

In an embodiment, in operation 925, the security area 410 may transmit, to the fingerprint sensor 340, notification that provides notification of a wait for fingerprint authentication. In an embodiment, the security area 410 may be connected to the fingerprint sensor 340 through a security path. In an embodiment, the fingerprint sensor 340 may be implemented in any one way among an ultrasonic way, an optical type way, or a capacitance way.

In an embodiment, in operation 930, the touch sensor 251 may deliver touch information to the fingerprint sensor 340. The touch information may include at least one of touch coordinates, touch intensity, a touch area, or a touch direction. For example, the touch sensor 251 may detect a touch of a finger on at least one area of the display 320 for fingerprint recognition. The touch sensor 251 may detect the touch information based on the touch of the finger being detected. The touch sensor 251 may deliver, to the fingerprint sensor 340, the touch information based on the detected finger touch.

In an embodiment, the fingerprint sensor 340 may obtain a fingerprint image based on the touch information received from the touch sensor 251 in operation 935, and may deliver the fingerprint image to the security area 410 in operation 940. In operation 945, the security area 410 may perform fingerprint authentication. For example, the security area 410 may compare the fingerprint image obtained through the fingerprint sensor 340 and a fingerprint image mapped to information indicative of a second UI (e.g., information indicative of a displayed guide line).

In an embodiment, a plurality of fingerprint images (e.g., the first fingerprint image to the ninth fingerprint image mapped to the first guide line 652 to the ninth guide line 678 in FIG. 6B) for one finger joint obtained through the fingerprint sensor 340 according to the fingerprint registration operation in FIGS. 5, 6A, 6B, and 7 may be encrypted by the security area 410 and stored in the memory 310.

In an embodiment, the security area 410 may decode the fingerprint image stored in the memory 310 and mapped to the information indicative of the second UI, and may compare the decoded fingerprint image and the fingerprint image obtained through the fingerprint sensor 340. When the fingerprint image obtained through the fingerprint sensor 340 and the decoded fingerprint image are identical with each other based on a result of the comparison, the security area 410 may determine that the fingerprint authentication has succeeded. In case that the fingerprint image obtained through the fingerprint sensor 340 and the decoded fingerprint image are not identical with each other based on a result of the comparison, the security area 410 may determine that the fingerprint authentication has failed.

In an embodiment, in operation 950, the security area 410 may deliver a result of the fingerprint authentication (e.g., a fingerprint authentication success or a fingerprint authentication failure) to the normal area 420. When receiving a result of the fingerprint authentication for a fingerprint authentication success from the security area 410, the normal area 420 may terminate (or complete) the fingerprint authentication. When receiving a result of the fingerprint authentication for a fingerprint authentication failure from the security area 410, the normal area 420 may transmit, to the security area 410, a signal to request that a new fingerprint image be obtained. In this case, the security area 410 may deliver, to the normal area 420, information on a UI having a lower quality value (e.g., a UI (e.g., a guide line) having a second priority) than a UI (e.g., a guide line) determined in operation 910. The security area 410 may transmit, to the fingerprint sensor 430, a signal to request that a new fingerprint image be obtained. The fingerprint sensor 430 may obtain a new fingerprint image based on the signal to request the acquisition of a new fingerprint image being received from the security area 410.

In various embodiments, although not illustrated, the normal area 420 may display a user interface that displays a result of fingerprint authentication based on a result of the fingerprint authentication being received from the security area 410. For example, when receiving a result of the fingerprint authentication for a fingerprint authentication success from the security area 410, the normal area 420 may display a user interface (e.g., a lock release user interface, a user interface for a website on which a login has been completed, or a user interface through which a payment service is performed) that displays that the fingerprint authentication has been completed. Furthermore, for example, when receiving a result of the fingerprint authentication for a fingerprint authentication failure from the security area 410, the normal area 420 may display a user interface (e.g., a user interface that requests a reattempt for fingerprint authentication, or a user interface for notification that provides notification that a corresponding function (e.g., a lock release function, a user authentication function, or a payment service function) cannot be performed because fingerprint authentication has failed) that displays that the fingerprint authentication has failed.

In an embodiment, in operation 955, the security area 410 may store a result of the fingerprint authentication (e.g., the success or failure of the fingerprint authentication using the fingerprint image mapped to the information indicative of the second UI). For example, thereafter, in a user authentication operation, in order to provide a UI (e.g., a guide line) having a high fingerprint authentication success rate based on information on a result of fingerprint authentication, the information on the result of the fingerprint authentication may be stored along with information indicative of the corresponding UI (e.g., a guide line).

In an embodiment, in operation 960, the normal area 420 may transmit, to the security area 410, a signal to request a wait for the termination of the fingerprint authentication. For example, when it is checked that a fingerprint authentication has succeeded based on a result of the fingerprint authentication received from the security area 410, operation 960 may be performed. In operation 965, the security area 410 may transmit, to the fingerprint sensor 340, notification that provides notification of the wait for the termination of the fingerprint authentication. Operation 965 may be an operation for providing guidance to the fingerprint sensor 340 so that the fingerprint sensor 340 can terminate the fingerprint authentication (or fingerprint recognition).

In an embodiment, in operation 970, the touch sensor 251 may deliver touch information to the fingerprint sensor 340. For example, the touch sensor 251 may detect that the finger coming into contact with at least one area of the display 320 is released. For example, the touched finger being released may mean an operation of having, by a user, his or her finger come into contact with at least one area of the display 320 for fingerprint recognition and then taking away the finger. When touch release is detected based on the touch information received from the touch sensor 251, the fingerprint sensor 340 may recognize that the touch of the finger for the fingerprint authentication has been released, and may terminate the fingerprint authentication in operation 975. In operation 980, the fingerprint sensor 340 may deliver, to the security area 410, notification that provides notification of the termination of the fingerprint authentication. In operation 985, the security area 410 may deliver, to the normal area 420, the notification that provides notification of the termination of the fingerprint authentication.

Referring again to FIG. 9, it has been described that after the touch release is detected, the fingerprint authentication is terminated, but the disclosure is not limited thereto. For example, when receiving a result of the fingerprint authentication for a fingerprint authentication success from the security area 410 in operation 950, the normal area 420 may terminate the fingerprint authentication operation without waiting for the touch release.

Figure 10:
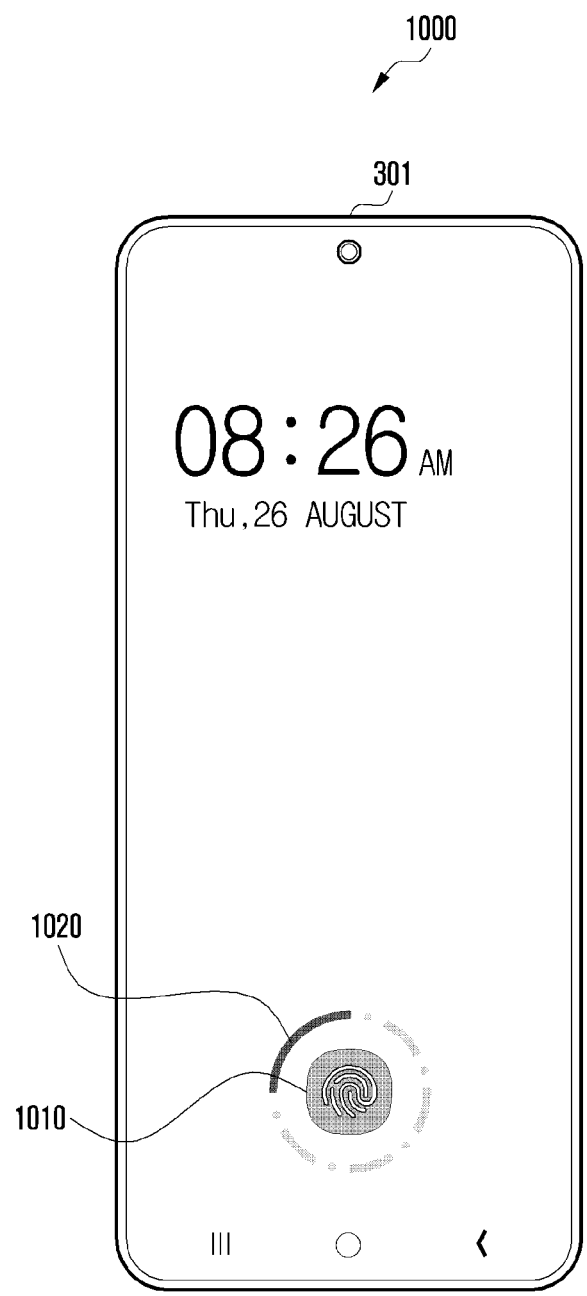
FIG. 10 is a diagram for describing a method of displaying a UI indicative of a fingerprint recognition area for fingerprint authentication and a UI providing guidance of a direction of a finger according to an embodiment of the disclosure.

FIG. 10 is a diagram for describing a method of displaying a UI indicative of a fingerprint recognition area for fingerprint authentication and a UI providing guidance of a direction of a finger according to an embodiment of the disclosure.

Referring to FIG. 10, in a diagram 1000, a processor (e.g., the processor 350 in FIG. 3) of an electronic device (e.g., the electronic device 301 in FIG. 3) may detect an input to request fingerprint authentication, for example, an input for releasing a lock screen. For example, the input for releasing a lock screen may include an input by which a display (e.g., the display 320 in FIG. 3) is touched or an input to press a key (e.g., a button) (e.g., the input module 150 in FIG. 1) (or an input to touch a key). Based on the input for releasing a lock screen being detected, the processor 350 may display the lock screen on the display 320, and may display a first UI 1010 indicative of a fingerprint recognition area (e.g., an area where a fingerprint sensor (e.g., the fingerprint sensor 340 in FIG. 3) is disposed) and a second UI 1020 indicative of a direction of a finger. The second UI 1020 may be a guide line corresponding to a fingerprint image having a high quality value among the first guide line 652 to the ninth guide line 678 according to the embodiments of FIG. 6B.

In an embodiment, the processor 350 may obtain a fingerprint image through the fingerprint sensor 340 based on a touch of a finger being detected in a fingerprint recognition area (e.g., the first UI 1010). The processor 350 may compare the fingerprint image obtained through the fingerprint sensor 340 and a fingerprint image mapped to information indicative of the second UI 1020, and may complete the fingerprint authentication when the obtained fingerprint image and the mapped fingerprint image are identical with each other. For example, as the fingerprint authentication is completed, the processor 350 may display a lock-released screen on the display 320.

Referring to FIGS. 8 to 10, it has been described that a UI (e.g., a guide line) indicative of a direction of a finger having a high quality value is provided, but the disclosure is not limited thereto. For example, the electronic device 301 may provide a UI (e.g., a guide line) for a direction that is frequently touched by a user. In relation to an embodiment in which a UI (e.g., a guide line) for a direction frequently touched by a user is provided, various embodiments will be described with reference to FIG. 11 that is described later.

FIG. 11 is a flowchart for describing a method of providing a guide for fingerprint authentication according to an embodiment of the disclosure.

Referring to FIG. 11, in a method 1100, in operation 1110, when an input signal to request fingerprint authentication is detected, a processor (e.g., the processor 350 in FIG. 3) of an electronic device (e.g., the electronic device 301 in FIG. 3) may identify a fingerprint image whose number of times used for fingerprint authentication is high among a plurality of fingerprint images stored in a memory (e.g., the memory 310 in FIG. 3). For example, the processor 350 may identify a fingerprint authentication log related to the fingerprint authentication number. If fingerprint authentication is performed (e.g., operation 840 in FIG. 8), the processor 350 may count the number of times that a fingerprint image used to perform the fingerprint authentication has been used, and may store the counted number of times in the memory 310. The processor 350 may identify the number of times that the fingerprint authentication has been performed by using each of a plurality of fingerprint images stored in the memory 310, based on the fingerprint authentication log.

In an embodiment, in operation 1120, the processor 350 may identify a direction of a fingerprint of the fingerprint image whose number of times used for the fingerprint authentication is high. For example, the processor 350 may identify whether a direction of a fingerprint is right upward, upward, or left upward. However, a direction of a fingerprint is not limited to be right upward, upward, or left upward.

In an embodiment, in operation 1130, the processor 350 may display a first UI indicative of a fingerprint recognition area and, as a second UI, a guide line corresponding to the identified direction of the fingerprint among the plurality of fingerprint images stored in the memory 310 and corresponding to a fingerprint image having a high quality value. In an embodiment, the second UI may be one of the first guide line 652 to the ninth guide line 678 in FIG. 6B.

For example, the processor 350 may extract at least one image corresponding to a direction of a fingerprint of the fingerprint image that has been identified in operation 1120 and that has been a lot used for the fingerprint authentication among the plurality of fingerprint images stored in the memory 310. The processor 350 may provide a second UI corresponding to a fingerprint image having a high quality value among the extracted one or more images.

The disclosure is not limited to the example. The processor 350 may extract a specific number of fingerprint images having a high quality value among the plurality of fingerprint images stored in the memory 310. The processor 350 may determine one fingerprint image corresponding to a direction of a fingerprint of a fingerprint image a lot used for fingerprint authentication among the specific number of extracted fingerprint images. The processor 350 may provide a second UI corresponding to the determined one fingerprint image. In an embodiment, if the number of fingerprint images corresponding to a direction of a fingerprint among the specific number of extracted fingerprint images is plural, the processor 350 may provide a second UI corresponding to a fingerprint image having a high quality value.

In an embodiment, in operation 1140, when a finger touches the fingerprint recognition area, the processor 350 may obtain a fingerprint image of the finger by using a fingerprint sensor (e.g., the fingerprint sensor 340 in FIG. 3). In operation 1150, the processor 350 may compare the obtained fingerprint image and a fingerprint image mapped to information indicative of the first UI and/or the second UI. In operation 1160, the processor 350 may perform the fingerprint authentication when the obtained fingerprint image and the fingerprint image mapped to the information indicative of the first UI and/or the second UI are identical with each other based on a result of the comparison.

In various embodiments, although not illustrated, the processor 350 may store information on a result of fingerprint authentication. For example, the processor 350 may store a result of the execution of fingerprint authentication by using a provided UI (e.g., a guide line), for example, information on a fingerprint authentication success or a fingerprint authentication failure along with information indicative of the corresponding UI (e.g., a guide line), but the disclosure is not limited thereto. The processor 350 may count and store the number of times that the fingerprint image used for the fingerprint authentication and corresponding to the second UI displayed in operation 1130 has been used.

In various embodiments, as a UI (e.g., a guide line) for providing guidance of a direction of a finger, which corresponds to a direction of a fingerprint of a fingerprint image used a lot for fingerprint authentication and corresponds to a fingerprint image having a high quality value is provided, fingerprint authentication can be conveniently performed through a UI (e.g., a guide line) having a direction frequently used by a user, and the time taken to perform the fingerprint authentication can be reduced.

A method of providing, by the electronic device 301, a fingerprint recognition guide according to various embodiments may include an operation of displaying a first UI indicative of a fingerprint recognition area and, as a second UI, a guide line corresponding to a fingerprint image having a high quality value among a plurality of fingerprint images stored in the memory 310 of the electronic device 301 by using the display 320 of the electronic device 301 when an input signal to request fingerprint authentication is detected, an operation of obtaining a fingerprint image of a finger by using the fingerprint sensor 340 disposed on one surface of the display 320 when the finger of a user touches the fingerprint recognition area, an operation of comparing the obtained fingerprint image and a fingerprint image mapped to information indicative of the first UI and/or the second UI, and an operation of performing the fingerprint authentication when the obtained fingerprint image and the mapped fingerprint image are identical with each other based on a result of the comparison.

In various embodiments, the first UI is an area where the fingerprint sensor 340 is disposed, and may include a graphic element for providing guidance so that the center of the finger is positioned in the graphic element.

In various embodiments, the second UI may be displayed in a way to be isolated from the first UI at a designated interval, and may include a graphic element for providing guidance so that the end of the finger is positioned in the graphic element.

The method of providing, by the electronic device 301, a fingerprint recognition guide according to various embodiments may further include an operation of displaying the first UI indicative of the fingerprint recognition area and a third UI corresponding to a fingerprint image having a lower quality value than the fingerprint image of the second UI among the plurality of fingerprint images stored in the memory 310 by using the display 320 when the obtained fingerprint image and the fingerprint image mapped to the information indicative of the first UI and/or the second UI are not identical with each other based on a result of the comparison.

The method of providing, by the electronic device 301, a fingerprint recognition guide according to various embodiments may further include an operation of storing a result of the fingerprint authentication in the memory 310.

In various embodiments, the operation of displaying the second UI may include an operation of displaying, as the second UI, a guide line having a high quality value among the plurality of fingerprint images stored in the memory 310 and a high fingerprint authentication success rate based on a result of the fingerprint authentication.

The method of providing, by the electronic device 301, a fingerprint recognition guide according to various embodiments may include an operation of identifying a fingerprint image whose number of times used for the fingerprint authentication is high among the plurality of fingerprint images stored in the memory 310 when the input signal to request the fingerprint authentication is detected, and an operation of identifying a direction of a fingerprint of the fingerprint image whose number of times used for the fingerprint authentication is high. The operation of displaying the second UI may include an operation of displaying, as the second UI, a guide line corresponding to the identified direction of the fingerprint among the plurality of fingerprint images stored in the memory 310 and corresponding to the fingerprint image having a high quality value.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a display;
   a fingerprint sensor disposed on one surface of the display;
   a memory; and
   a processor operatively connected to the display, the fingerprint sensor, and the memory,
   wherein the processor is configured to:
     display a user interface (UI) indicative of a fingerprint recognition area and a first guide line providing guidance of a first direction of a finger of a user by using the display, based on an input signal to request that fingerprint registration is detected,
     obtain a first fingerprint image of the finger by using the fingerprint sensor based on the finger touching the fingerprint recognition area,
     store, in the memory, first information indicative of the first guide line and the obtained first fingerprint image by mapping the first information and the obtained first fingerprint image,
     display a second guide line providing guidance of a second direction of the finger by using the display after mapping and storing the first information and the obtained first fingerprint image in the memory, wherein the second direction is different from the first direction,
     obtain a second fingerprint image of the finger by using the fingerprint sensor based on the finger touching the fingerprint recognition area, and
     store, in the memory, second information indicative of the second guide line and the obtained second fingerprint image by mapping the second information and the obtained second fingerprint image,
   wherein the first guide line comprises a first graphic element for guiding the finger to be directed toward the first graphic element, and
   wherein the second guide line comprises a second graphic element for guiding the finger to be directed toward the second graphic element.

2. The electronic device of claim 1,
   wherein the UI is as an area where the fingerprint sensor is disposed and comprises a graphic element for providing guidance so that a center of the finger is positioned in the graphic element,
   wherein the first guide line and the second guide line are displayed in a way to be isolated from the UI at a designated interval, and
   wherein each of the first guide line and the second guide line comprises a graphic element for providing guidance so that an end of the finger is positioned in the graphic element.

3. The electronic device of claim 1, wherein the processor is further configured to:
   extract a characteristic of a fingerprint by analyzing the obtained first fingerprint image, and
   calculate a quality value of the first fingerprint image according to a predefined criterion based on the extracted characteristic of the fingerprint.

4. The electronic device of claim 3, wherein the processor is further configured to extract at least one of:
   a first characteristic for whether a directionality of ridges and valleys of the fingerprint is constant based on the directionality of ridges and valleys of the fingerprint,
   a second characteristic for a disconnection degree of the fingerprint,
   a third characteristic for a ratio occupied by a lumped portion based on the lumped portion being present in the first fingerprint image, or
   a fourth characteristic for a ratio occupied by an unfocused portion based on the unfocused portion being present in the first fingerprint image.

5. The electronic device of claim 4, wherein the processor is further configured to:
   extract the characteristic of a fingerprint by analyzing the obtained second fingerprint image,
   calculate a quality value of the second fingerprint image according to a predefined criterion based on the extracted characteristic of the fingerprint, and
   store the first fingerprint image and the second fingerprint image in the memory in order of a fingerprint image having a high quality value based on the quality value of the first fingerprint image and the quality value of the second fingerprint image.

6. The electronic device of claim 1, wherein the processor is further configured to further store touch information based on a touch of the finger, which is received from a touch sensor, based on the touch of the finger being detected in the fingerprint recognition area.

7. The electronic device of claim 6, wherein the touch information comprises at least one of touch coordinates, touch intensity, a touch area, or a touch direction.

8. The electronic device of claim 1, wherein the processor is further configured to:
   maintain the display of the UI indicative of the fingerprint recognition area after mapping and storing the first information indicative of the first guide line and the obtained first fingerprint image in the memory, and display the second guide line providing guidance of the second direction of the finger instead of the first guide line providing guidance of the first direction of the finger.

9. An electronic device comprising:
a display;
a fingerprint sensor disposed on one surface of the display;
a memory storing a plurality of fingerprint images mapped to information indicative of a plurality of guide lines; and
a processor operatively connected to the display, the fingerprint sensor, and the memory,
wherein the processor is configured to:
display a first user interface (UI) indicative of a fingerprint recognition area, and as a second UI including a guide line corresponding to a fingerprint image having a high quality value among the plurality of fingerprint images stored in the memory by using the display, based on an input signal to request that fingerprint authentication is detected, wherein the guide line comprises a graphic element for guiding a finger to be directed toward the graphic element,
obtain a fingerprint image of a finger by using the fingerprint sensor based on the finger of a user touching the fingerprint recognition area,
compare the obtained fingerprint image and a fingerprint image mapped to information indicative of at least one of the first UI or the second UI, and
perform the fingerprint authentication based on the obtained fingerprint image and the mapped fingerprint image being identical with each other based on a result of the comparison.

10. The electronic device of claim 9,
wherein the first UI is an area where the fingerprint sensor is disposed, and comprises a graphic element for providing guidance so that a center of the finger is positioned in the graphic element,
wherein the second UI is displayed in a way to be isolated from the first UI at a designated interval, and
wherein the second UI comprises a graphic element for providing guidance so that an end of the finger is positioned in the graphic element.

11. The electronic device of claim 9, wherein the processor is further configured to display the first UI indicative of the fingerprint recognition area and a third UI corresponding to a fingerprint image having a lower quality value than the fingerprint image of the second UI among the plurality of fingerprint images stored in the memory by using the display, based on the obtained fingerprint image and the fingerprint image mapped to the information indicative of at least one of the first UI or the second UI being not identical with each other based on a result of the comparison.

12. The electronic device of claim 11, wherein the processor is further configured to store a result of the fingerprint authentication in the memory.

13. The electronic device of claim 12, wherein the processor is further configured to display, as the second UI, a guide line having a high quality value among the plurality of fingerprint images stored in the memory and having a high fingerprint authentication success rate based on a result of the fingerprint authentication, based on the input signal to request the fingerprint authentication being detected.

14. The electronic device of claim 9, wherein the processor is further configured to:
check a fingerprint image whose number of times used for the fingerprint authentication is high among the plurality of fingerprint images stored in the memory based on the input signal to request the fingerprint authentication being detected,
identify a direction of a fingerprint of the fingerprint image whose number of times used for the fingerprint authentication is high, and
display, as the second UI, a guide line corresponding to the identified direction of the fingerprint and corresponding to a fingerprint image having the high quality value among the plurality of fingerprint images stored in the memory.

15. A method of providing, by an electronic device, a fingerprint recognition guide, the method comprising:
displaying a first user interface (UI) indicative of a fingerprint recognition area and, as a second UI, a guide line corresponding to a fingerprint image having a high quality value among a plurality of fingerprint images stored in a memory of the electronic device by using a display of the electronic device, based on an input signal to request fingerprint authentication being detected, wherein the guide line comprises a graphic element for guiding a finger to be directed toward the graphic element;
obtaining a fingerprint image of the finger by using a fingerprint sensor disposed on one surface of the display based on the finger of a user touching the fingerprint recognition area;
comparing the obtained fingerprint image and a fingerprint image mapped to information indicative of at least one of the first UI or the second UI; and
performing the fingerprint authentication based on the obtained fingerprint image and the mapped fingerprint image being identical with each other, based on a result of the comparison.

16. The method of claim 15,
wherein the first UI is an area where the fingerprint sensor is disposed, and comprises a graphic element for providing guidance so that a center of the finger is positioned in the graphic element,
wherein the second UI is displayed in a way to be isolated from the first UI at a designated interval, and
wherein the second UI comprises a graphic element for providing guidance so that an end of the finger is positioned in the graphic element.

17. The method of claim 15, further comprising displaying the first UI indicative of the fingerprint recognition area and a third UI corresponding to a fingerprint image having a lower quality value than the fingerprint image of the second UI among the plurality of fingerprint images stored in the memory by using the display, based on the obtained fingerprint image and the fingerprint image mapped to the information indicative of at least one of the first UI or the second UI being not identical with each other based on a result of the comparison.

18. The method of claim 17, further comprising storing a result of the fingerprint authentication in the memory.

19. The method of claim 18, wherein displaying the second UI comprises displaying, as the second UI, a guide line having a high quality value among the plurality of fingerprint images stored in the memory and a high fingerprint authentication success rate based on a result of the fingerprint authentication.

20. The method of claim 15, further comprising:
identifying a fingerprint image whose number of times used for the fingerprint authentication is high among the plurality of fingerprint images stored in the memory based on the input signal to request the fingerprint authentication being detected; and identifying a direction of a fingerprint of the fingerprint image whose number of times used for the fingerprint authentication is high, wherein displaying the second UI comprises displaying, as the second UI, a guide line corresponding to the identified direction of the fingerprint among the plurality of fingerprint images stored in the memory and corresponding to the fingerprint image having a high quality value.

* * * * *